US012747794B2

(12) United States Patent
He et al.

(10) Patent No.: US 12,747,794 B2
(45) Date of Patent: Sep. 29, 2026

(54) VALVE HEAD STRUCTURE AND FLOW REGULATING VALVE WITH VALVE HEAD STRUCTURE

(71) Applicant: Zhejiang Dunan Artificial Environment Co., Ltd., Shaoxing (CN)

(72) Inventors: Yuchen He, Shaoxing (CN); Leqiang Liu, Shaoxing (CN); Fangying Zhu, Shaoxing (CN)

(73) Assignee: Zhejiang Dunan Artificial Environment Co., Ltd., Shaoxing (CN)

( * ) Notice: Subject to any disclaimer, the term of this patent is extended or adjusted under 35 U.S.C. 154(b) by 135 days.

(21) Appl. No.: 18/703,339

(22) PCT Filed: Oct. 12, 2022

(86) PCT No.: PCT/CN2022/124929

§ 371 (c)(1),
(2) Date: Apr. 20, 2024

(87) PCT Pub. No.: WO2023/066115

PCT Pub. Date: Apr. 27, 2023

(65) Prior Publication Data

US 2024/0410470 A1 Dec. 12, 2024

(30) Foreign Application Priority Data

Oct. 20, 2021 (CN) ......................... 202111222138.2
Oct. 20, 2021 (CN) ......................... 202111223524.3

(Continued)

(51) Int. Cl.
*F16K 1/36* (2006.01)
*F16K 1/42* (2006.01)

(Continued)

(52) U.S. Cl.
CPC .................. *F16K 1/52* (2013.01); *F16K 1/36* (2013.01); *F16K 1/42* (2013.01); *F16K 1/48* (2013.01);

(Continued)

(58) Field of Classification Search
CPC ..... F16K 1/52; F16K 1/36; F16K 1/54; F16K 39/024; F16K 1/42; F16K 1/48;

(Continued)

(56) References Cited

U.S. PATENT DOCUMENTS 10,161,528 B2 12/2018 Shen
11,644,118 B2 * 5/2023 Zhan ......................... F16K 1/54
62/528

(Continued)

FOREIGN PATENT DOCUMENTS

CN 103574131 A 2/2014
CN 104180567 A 12/2014

(Continued)

OTHER PUBLICATIONS

The first office action of counterpart EP application No. 22882725.9 issued on Jan. 17, 2025.

(Continued)

*Primary Examiner* — Marina A Tietjen
(74) *Attorney, Agent, or Firm* — The Sun IP Law

(57) ABSTRACT

A valve head structure and a flow regulating valve with the valve head structure. The valve head structure is disposed in a valve body of the flow regulating valve for closing or avoiding a valve port of the valve body. The valve head structure includes: a valve head, which is movably disposed in the valve body; and an accommodating groove, which is formed in the valve head and is used for accommodating fluid in the valve body, wherein a distance between the valve head and the valve port is adjustable, and when the valve (Continued)

head moves to a position where the distance with the valve port is the maximum, at least part of the accommodating groove is located in an accommodating cavity of the valve body.

26 Claims, 15 Drawing Sheets

(30) Foreign Application Priority Data

Oct. 20, 2021 (CN) ......................... 202122533129.7
Oct. 20, 2021 (CN) ......................... 202122533263.7
Oct. 20, 2021 (CN) ......................... 202122533332.4
Oct. 20, 2021 (CN) ......................... 202122533820.5
Oct. 20, 2021 (CN) ......................... 202122533956.6

(51) Int. Cl.

*F16K 1/48* (2006.01)
*F16K 1/52* (2006.01)
*F16K 1/54* (2006.01)
*F16K 27/02* (2006.01)
*F16K 39/02* (2006.01)
*F25B 41/35* (2021.01)

(52) U.S. Cl.

CPC ............ *F16K 1/54* (2013.01); *F16K 27/0254* (2013.01); *F16K 39/024* (2013.01); *F25B 41/35* (2021.01)

(58) Field of Classification Search

CPC .... F16K 27/0254; F16K 27/029; F25B 41/35; F25B 41/345

See application file for complete search history.

(56) References Cited

U.S. PATENT DOCUMENTS

2018/0258927 A1 9/2018 Lv
2020/0340596 A1 10/2020 Lv
2021/0190398 A1 * 6/2021 Zhan ....................... F16K 31/50

FOREIGN PATENT DOCUMENTS

CN 104930762 A 9/2015
CN 107178621 A 9/2017
CN 107289138 A 10/2017
CN 107304843 A 10/2017
CN 107366772 A 11/2017
CN 207470790 U 6/2018
CN 108999990 A 12/2018
CN 209180369 7/2019
CN 111577902 A 8/2020
CN 216200584 U 4/2022
CN 216200586 U 4/2022
CN 216200588 U 4/2022
CN 216478963 U 5/2022
CN 217177456 U 8/2022
JP 0258470 B 7/1959
JP 2001324043 A 11/2001
JP 2013113361 A 6/2013
JP 2014035006 A 2/2014
JP 2015001171 A 1/2015
JP 2016145656 A 8/2016
JP 2017203508 A 11/2017
JP 6659624 B2 3/2020
JP 2021511467 A 5/2021

OTHER PUBLICATIONS

The first office action of counterpart JP application No. 2024519987 issued on Mar. 12, 2025.

The first office action of counterpart CN application No. 2021112235243 issued on Aug. 23, 2025.

1 The reconsideration report of counterpart JP application No. 2024-519987 issued on Nov. 25, 2025.

The office action of counterpart CN application No. 2021112221382 was issued on Apr. 9, 2026.

The CN search report of counterpart CN application No. 2021112221382 was issued on Apr. 8, 2026.

* cited by examiner

VALVE HEAD STRUCTURE AND FLOW REGULATING VALVE WITH VALVE HEAD STRUCTURE

CROSS-REFERENCE TO RELATED APPLICATION

The present disclosure is a national stage application of International Patent Application No. PCT/CN2022/124929, which is filed on Oct. 12, 2022. The International Patent Application claims the priority of Chinese Application No. 202111222138.2, filed in the Chinese Patent Office on Oct. 20, 2021, and entitled "Valve Head Structure and Electronic Expansion Valve with Valve Head Structure", the priority of Chinese Application No. 202122533820.5, filed in the Chinese Patent Office on Oct. 20, 2021, and entitled "Valve Head Structure and Electronic Expansion Valve with Valve Head Structure", the priority of Chinese Application No. 202111223524.3, filed in the Chinese Patent Office on Oct. 20, 2021, and entitled "Flow Regulating Valve", the priority of Chinese Application No. 202122533129.7, filed in the Chinese Patent Office on Oct. 20, 2021, and entitled "Flow Regulating Valve", the priority of Chinese Application No. 202122533263.7, filed in the Chinese Patent Office on Oct. 20, 2021, and entitled "Flow Regulating Valve", the priority of Chinese Application No. 202122533332.4, filed in the Chinese Patent Office on Oct. 20, 2021, and entitled "Flow Regulating Valve", and the priority of Chinese Application No. 202122533956.6, filed in the Chinese Patent Office on Oct. 20, 2021, and entitled "Flow Regulating Valve", the entire contents of which are herein incorporated by reference.

TECHNICAL FIELD

The present disclosure relates to the field of flow regulating valves, and in particular to a valve head structure and a flow regulating valve with the valve head structure.

BACKGROUND

In an existing flow regulating valve, a part of a valve head extending into a valve cavity is usually of a cylindrical structure.

However, when a valve body needs to be made small so as to reduce the cost of the product, even when the valve head of the above valve head structure is fully opened, due to a limited space inside the valve cavity, a flow resistance in the valve cavity is large, resulting in a smaller Cv value (i.e., the flow of the fluid passing through each minute), and thus design requirements of the Cv value cannot be met.

SUMMARY

Some embodiments of the present disclosure provide a valve head structure and a flow regulating valve with the valve head structure, so as to solve the problem that the settings of the valve head structure in the prior art affect the flow of fluid in the flow regulating valve.

In order to achieve the above objective, according to one aspect of the present disclosure, provided is a valve head structure, which is disposed in a valve body of a flow regulating valve for closing or avoiding a valve port of the valve body, wherein the valve head structure includes: a valve head, which is movably disposed in the valve body; and an accommodating groove, which is formed in the valve head and is used for accommodating fluid in the valve body, wherein a distance between the valve head and the valve port is adjustable, and when the valve head moves to a position where the distance with the valve port is the maximum, at least part of the accommodating groove is located in an accommodating cavity of the valve body.

In some embodiments, the accommodating groove is disposed around the valve head; and/or, the accommodating groove is of an annular structure.

In some embodiments, the accommodating groove is provided with a first transition section, and the first transition section is located at a first end of the accommodating groove that is away from the valve port; and a cross-sectional area of the first transition section gradually decreases in a direction where the valve head is close to the valve port.

In some embodiments, the valve head includes a sealing head for blocking the valve port, and the sealing head is disposed at a second end of the accommodating groove that is close to the valve port.

In some embodiments, the accommodating groove is provided with a second transition section, and the second transition section is located at the end of the accommodating groove that is close to the sealing head; and a cross-sectional area of the second transition section gradually increases in a direction where the accommodating groove is close to the sealing head.

In some embodiments, the valve head includes an accommodating cavity body, the accommodating cavity body is used for accommodating a fluid in the accommodating cavity, the valve head includes a circulation channel, a first end of the circulation channel communicates with the accommodating cavity body, and a second end of the circulation channel communicates with the accommodating cavity.

In some embodiments, the circulation channel includes a first circulation channel and a second circulation channel, the first circulation channel communicates with the accommodating cavity body, and the second circulation channel is used for communicating with the accommodating cavity; and in an extension direction of the valve head, the cross-sectional area of the second circulation channel is greater than a cross-sectional area of the first circulation channel.

In some embodiments, the accommodating cavity body extends to an end of the valve head that is away from the valve port, so that the fluid in the accommodating cavity flows, after passing through the accommodating cavity body, from a side of the valve head that is close to the valve port to a side of the valve head that is away from the valve port.

In some embodiments, a first end of the valve head that is close to the valve port is provided with a sealing head for blocking the valve port, a second end of the valve head that is away from the valve port is provided with a guide head for contacting with the valve body, the sealing head and the guide head are both of cylindrical structures, and a diameter of a sealing line formed between the sealing head and the valve port is equal to an outer diameter of the guide head.

In some embodiments, the valve head includes an annular groove for mounting an annular sealing ring, and the annular groove is located between the guide head and the accommodating groove.

According to another aspect of the present disclosure, provided is a flow regulating valve, including a valve head structure, the valve head structure is the above valve head structure.

In the technical solution of the present disclosure, the valve head structure of the present embodiment is disposed in the valve body of the flow regulating valve for closing or avoiding the valve port, the valve head structure includes:

the valve head, which is movably disposed in the valve body; and the accommodating groove, which is formed in the valve head and is used for accommodating the fluid in the valve body, wherein the distance between the valve head and the valve port is adjustable, and when the valve head moves to the position where the distance with the valve port is the maximum, at least part of the accommodating groove is located in the accommodating cavity of the valve body. It should be noted that, when the valve head works, the valve head moves close to the valve port or moves away from the valve port in the accommodating cavity, so as to complete the action of blocking or avoiding the valve port, and the maximum distance between the valve head and the valve port is the maximum stroke of the valve head. By using the above settings, the part of the valve head, which is located in the accommodating cavity of the valve body, is provided with the accommodating groove, and the accommodating groove increases the volume of the accommodating cavity, so that the accommodating cavity can accommodate more fluid, and the flow space of the fluid in the accommodating cavity is increased. Moreover, the fluid is stored in the accommodating groove, when the fluid passes through the accommodating cavity, the fluid flowing outside the accommodating groove is in contact with the fluid in the accommodating groove, thereby avoiding the contact between the fluid and the valve head, and reducing the flow resistance of the fluid. Therefore, it is possible to solve the problem that the settings of the valve head structure in the prior art have large flow resistance, thus affecting the flow of the fluid in the flow regulating valve.

BRIEF DESCRIPTION OF THE DRAWINGS

The drawings, which constitute a part of the present disclosure, are used for providing a further understanding of the present disclosure, and schematic embodiments of the present disclosure and description thereof are used for explaining the present disclosure, and do not constitute improper limitations on the present disclosure. In the drawings.

The drawings include the following reference signs:

10, valve body; 101, valve port; 102, top wall; 104, bottom wall; 105, circulation hole; 111, overflowing hole segment; 112, sealing hole segment; 113, second conical surface; 114, flow guide hole segment; 115, a third conical surface; 11, accommodating cavity; 121, limiting hole segment; 122, guide hole segment; 123, valve cavity; 13, main valve seat; 1301, first step; 14, auxiliary valve seat; 141, second step; 142, auxiliary valve body; 1421, main body; 1422, annular boss; 1423, flanging structure; 143, sealing gasket; 144, first mounting groove; 145, second mounting groove; 16, arc surface; 212, connecting hole;

20, valve head; 21, rod body; 22, sealing head; 23, first conical surface; 120, accommodating cavity body; 103, circulation channel; 131, first circulation channel; 132, second circulation channel; 24, guide head; 241, annular groove;

2, accommodating groove; 201, first transition section; 202, second transition section; 3, annular sealing ring; 31, first connecting pipe; 32, flow guide surface; 33, inner end; 34, outer end; 35, second connecting pipe;

40, guide sleeve; 41, first sleeve section; 42, second sleeve section; 43, lower end surface;

50, valve needle structure; 51, screw; 511, first rod section; 512, second rod section; 513, third rod section; 52, bearing; 53, bushing; 54, pressing sleeve;

60, valve cylinder; 61, sealing cavity.

DETAILED DESCRIPTION OF THE EMBODIMENTS

It should be noted that, in the case of no conflict, embodiments in the present disclosure and features in the embodiments may be combined with each other. The present disclosure will be described in detail below with reference to the drawings and in combination with the embodiments.

Figure 1:
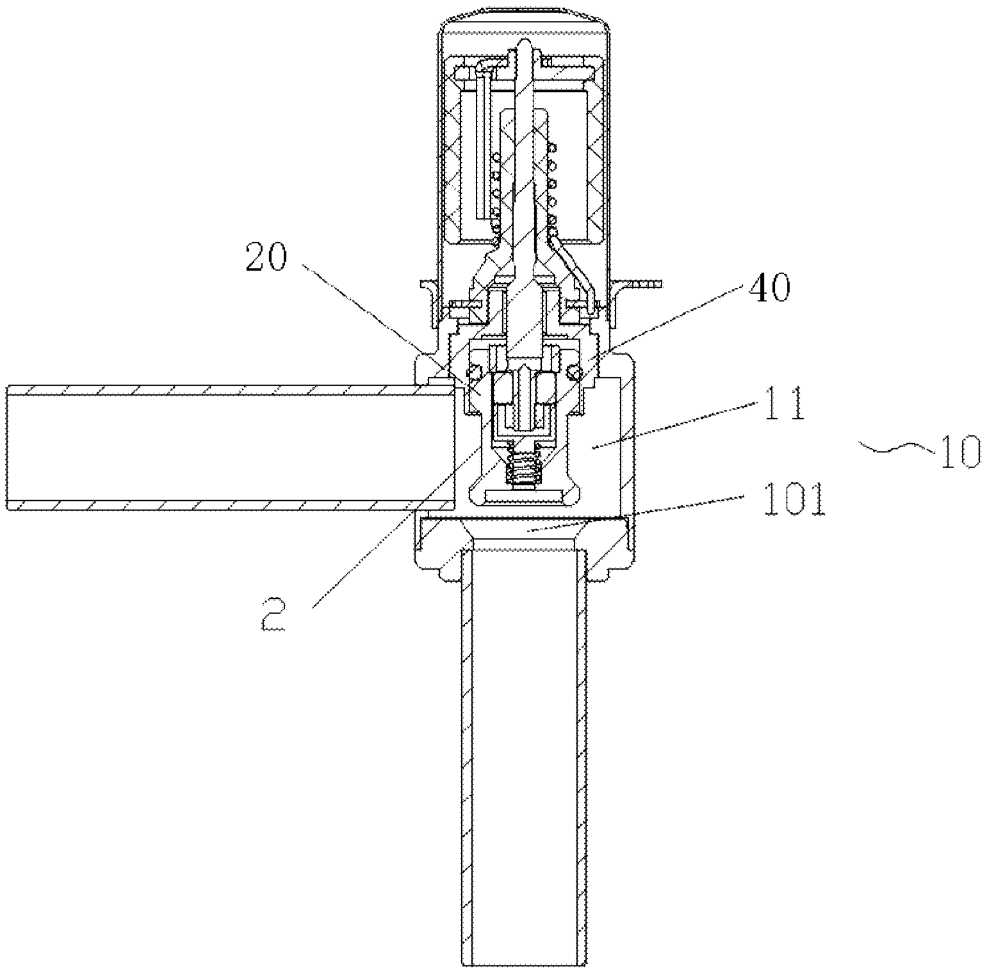
FIG. 1 illustrates a schematic diagram of an internal structure of an embodiment of a flow regulating valve according to the present disclosure.
Figure 2:
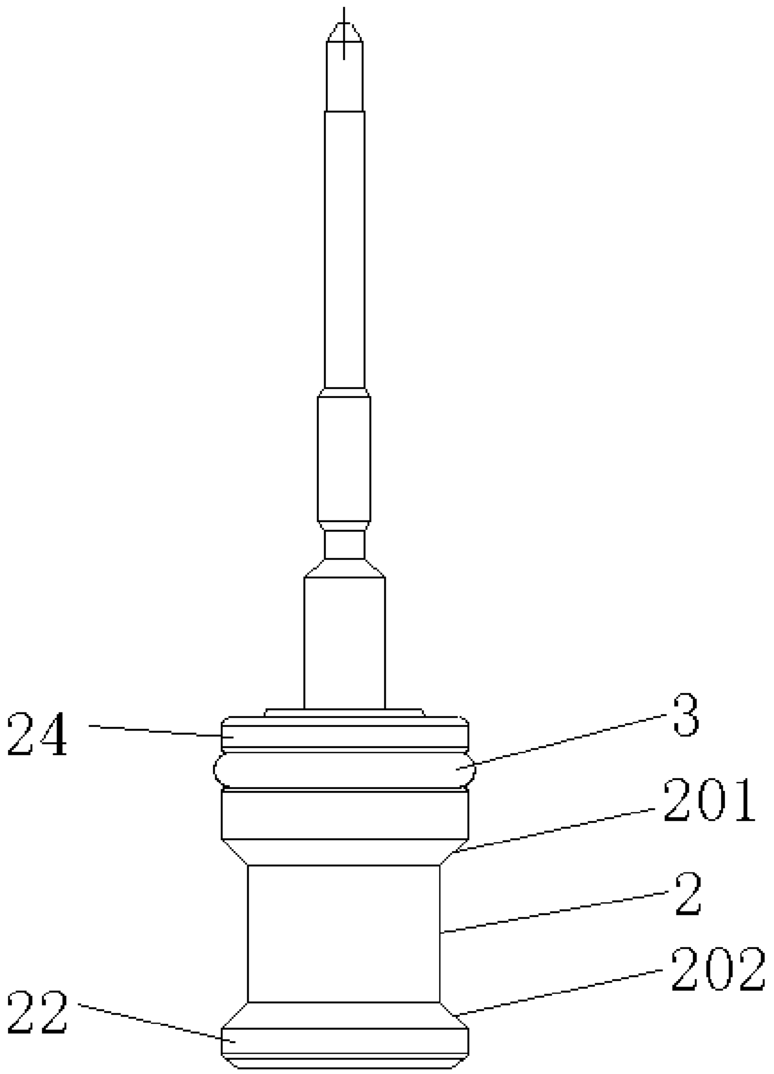
FIG. 2 illustrates a schematic structural diagram of a valve head structure of a flow regulating valve of the present disclosure.
Figure 3:
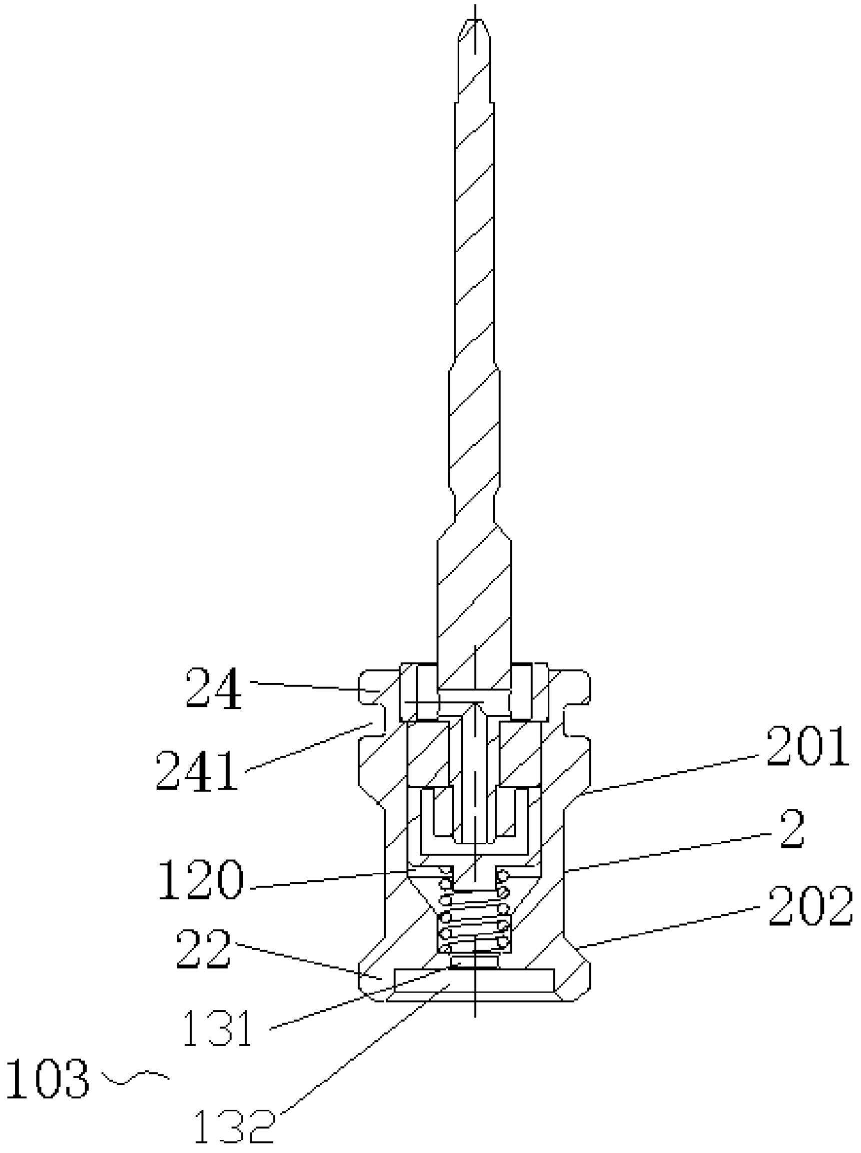
FIG. 3 illustrates a schematic diagram of an internal structure of a valve head structure of a flow regulating valve of the present disclosure.

As shown in FIG. 1 to FIG. 3, a valve head structure of the present embodiment is disposed in a valve body 10 of a flow regulating valve for closing or avoiding a valve port 101 of the valve body 10, the valve head structure includes: a valve head 20, which is movably disposed in the valve body 10; and an accommodating groove 2, which is formed in the valve head 20 and is used for accommodating fluid in the valve body 10, wherein a distance between the valve head 20 and the valve port 101 is adjustable, and when the valve head 20 moves to a position where the distance with the valve port 101 is the maximum, at least part of the accommodating groove 2 is located in an accommodating cavity 11 of the valve body 10. It should be noted that, when the valve head 20 works, the valve head 20 moves close to the valve port 101 or moves away from the valve port 101 in the accommodating cavity 11, so as to complete an action of blocking or avoiding the valve port 101, and the maximum distance between the valve head 20 and the valve port 101 is the maximum stroke of the valve head 20. By using the above settings, the part of the valve head 20, which is located in the accommodating cavity 11 of the valve body 10, is provided with the accommodating groove 2, and the accommodating groove 2 increases a volume of the accommodating cavity 11, so that the accommodating cavity 11 can accommodate more fluid, a flow space of the fluid in the accommodating cavity 11 is increased, a turbulent flow in the valve cavity is reduced, and a flow resistance of the fluid is reduced. Therefore, it is possible to solve the problem that the settings of the valve head structure in a prior art affect the flow of the fluid in the flow regulating valve.

In the valve head structure of the present embodiment, the accommodating groove 2 is disposed around the valve head 20; and/or, the accommodating groove 2 is of an annular structure. By using the above settings, the processing is convenient, and the production cost is reduced.

As shown in FIG. 1 to FIG. 3, in the valve head structure of the present embodiment, the accommodating groove 2 is provided with a first transition section 201, and the first transition section 201 is located at an end of the accommodating groove 2 that is away from the valve port 101; and a cross-sectional area of the first transition section 201 gradually decreases in a direction where the valve head 20 is close to the valve port 101. By using the above settings, the vortex generated by a sudden change in size is avoided, thereby reducing the flow resistance of the fluid.

In the valve head structure of the present embodiment, the valve head 20 includes a sealing head 22 for blocking the valve port 101, and the sealing head 22 is disposed at an end of the accommodating groove 2 that is close to the valve port 101. In this way, when the valve head 20 is opened, the fluid flows through the sealing head 22 and then flows out from the valve port 101.

In the valve head structure of the present embodiment, the accommodating groove 2 is provided with a second transition section 202, and the second transition section 202 is located at the end of the accommodating groove 2 that is close to the sealing head 22; and a cross-sectional area of the second transition section 202 gradually increases in a direction where the accommodating groove 2 is close to the sealing head 22. In this way, the flow of the fluid is better facilitated.

As shown in FIG. 1 to FIG. 3, in the valve head structure of the present embodiment, the valve head 20 includes an accommodating cavity body 120, the accommodating cavity body 120 is used for accommodating the fluid in the accommodating cavity 11, the valve head 20 includes a circulation channel 103, a first end of the circulation channel 103 communicates with the accommodating cavity body 120, and a second end of the circulation channel 103 communicates with the accommodating cavity 11. In this way, the fluid in the accommodating cavity body 120 can enter the accommodating cavity body 120 by the circulation channel 103, thereby increasing the liquidity of the fluid in the accommodating cavity body 120.

In the valve head structure of the embodiment, the circulation channel 103 includes a first circulation channel 131 and a second circulation channel 132, the first circulation channel 131 communicates with the accommodating cavity body 120, and the second circulation channel 132 is used for communicating with the accommodating cavity 11; and in an extension direction of the valve head 20, a cross-sectional area of the second circulation channel 132 is greater than a cross-sectional area of the first circulation channel 131. In this way, when the valve head 20 moves close to the valve port 101, the second circulation channel 132 can reduce the vortex at a bottom of the valve head, thereby reducing the flow resistance.

As shown in FIG. 1 to FIG. 3, in the valve head structure of the present embodiment, the accommodating cavity body 120 extends to the end of the valve head 20 that is away from the valve port 101, so that the fluid in the accommodating cavity 11 flows, after passing through the accommodating cavity body 120, from a side of the valve head 20 that is close to the valve port 101 to a side of the valve head 20 that is away from the valve port 101. In this way, the pressure of the fluid in the accommodating cavity 11 can be released, so that the operation of the valve head structure is smoother.

In the valve head structure of the present embodiment, the end of the valve head 20 that is close to the valve port 101 is provided with a sealing head 22 for blocking the valve port 101, the end of the valve head 20 that is away from the valve port 101 is provided with a guide head 24 for contacting with the valve body 10, the sealing head 22 and the guide head 24 are both of cylindrical structures, and the sealing head 22 has the same outer diameter as the guide head 24. In this way, two ends of the valve head 20 bear the same pressure, so that the operation of the valve head structure is smoother.

As shown in FIG. 1 to FIG. 3, in the valve head structure of the present embodiment, the valve head 20 includes an annular groove 241 for mounting an annular sealing ring 3, and the annular groove 241 is located between the guide head 24 and the accommodating groove 2.

The flow regulating valve of the present embodiment includes the above valve head structure.

The valve head structure of the flow regulating valve of the present embodiment is described as follows:

the section of the valve head structure extending into the accommodating cavity 11 is provided with the accommodating groove 2, so that the flow space of the fluid in the accommodating cavity 11 is increased, and the flow resistance is reduced.

The valve head structure is disposed in a guide sleeve 40, and the pressure of the fluid at an upper part of the valve head 20 is made the same as the pressure of the fluid at a lower part of the valve head 20 by a through hole structure in the valve head 20, so that the valve head 20 bears the same pressure difference when being closed.

When the valve head is at a fully opened position, the accommodating groove 2 and the second transition section 202 are still in the accommodating cavity 11, and an upper part of the second transition section 202 is not lower than a lower edge of the guide sleeve 40.

The structure may increase the flow space of the fluid in the accommodating cavity 11, reduce the flow resistance, and increase a Cv value when an expansion valve is fully opened.

As can be seen from the above description, the above embodiments of the present disclosure achieve the following technical effects:

the valve head structure of the present embodiment is disposed in the valve body 10 of the flow regulating valve for closing or avoiding the valve port 101 of the valve body 10, the valve head structure includes: the valve head 20, which is movably disposed in the valve body 10; and the accommodating groove 2, which is formed in the valve head 20 and is used for accommodating the fluid in the valve body 10, wherein the distance between the valve head 20 and the valve port 101 is adjustable, and when the valve head 20 moves to the position where the distance with the valve port 101 is the maximum, at least part of the accommodating groove 2 is located in the accommodating cavity 11 of the valve body 10. It should be noted that, when the valve head 20 works, the valve head 20 moves close to the valve port 101 or moves away from the valve port 101 in the accommodating cavity 11, so as to complete the action of blocking or avoiding the valve port 101, and the maximum distance between the valve head 20 and the valve port 101 is the maximum stroke of the valve head 20. By using the above settings, the part of the valve head 20, which is located in the accommodating cavity 11 of the valve body 10, is provided with the accommodating groove 2, and the accommodating groove 2 increases the volume of the accommodating cavity 11, so that the accommodating cavity 11 can accommodate more fluid, the flow space of the fluid in the accommodating cavity 11 is increased, and the flow resistance of the fluid is reduced. Therefore, it is possible to solve the problem that the settings of the valve head structure in the prior art affect the flow of the fluid in the flow regulating valve.

Figure 4:
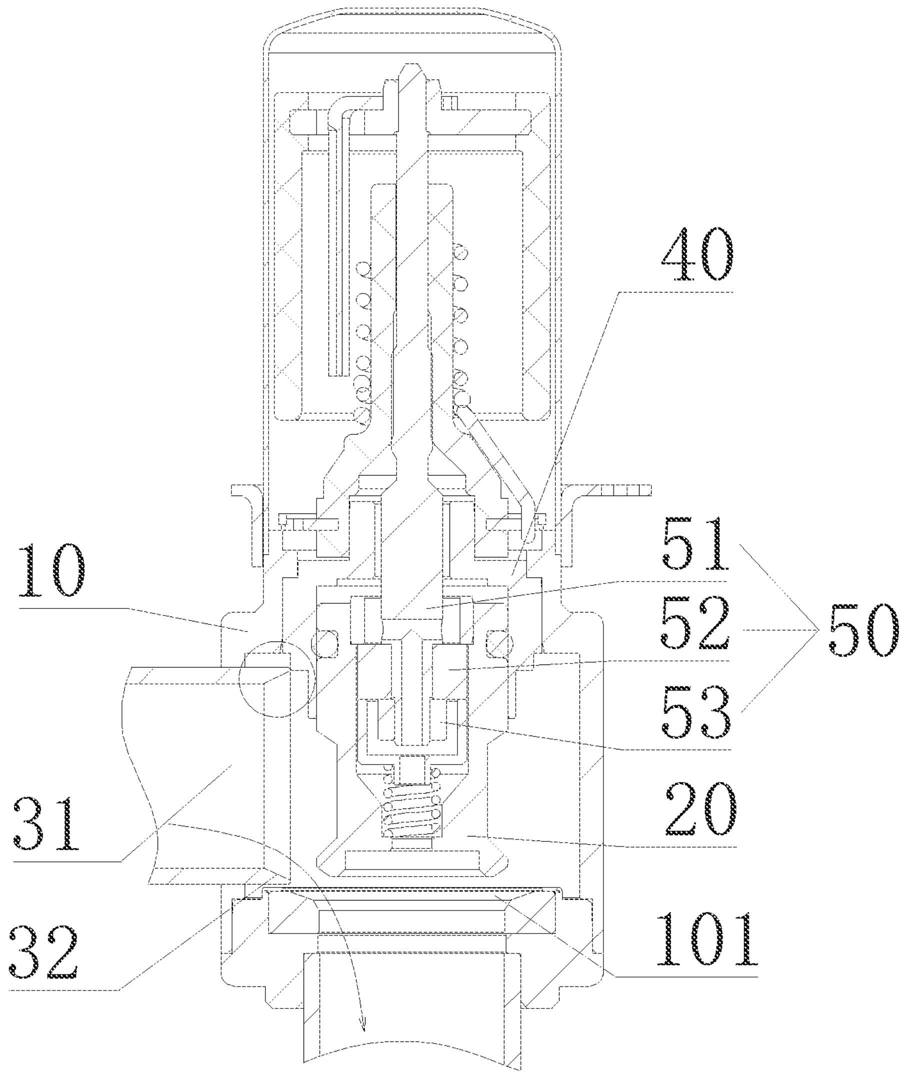
FIG. 4 illustrates a schematic structural diagram of a flow regulating valve provided in the present disclosure.
Figure 5:
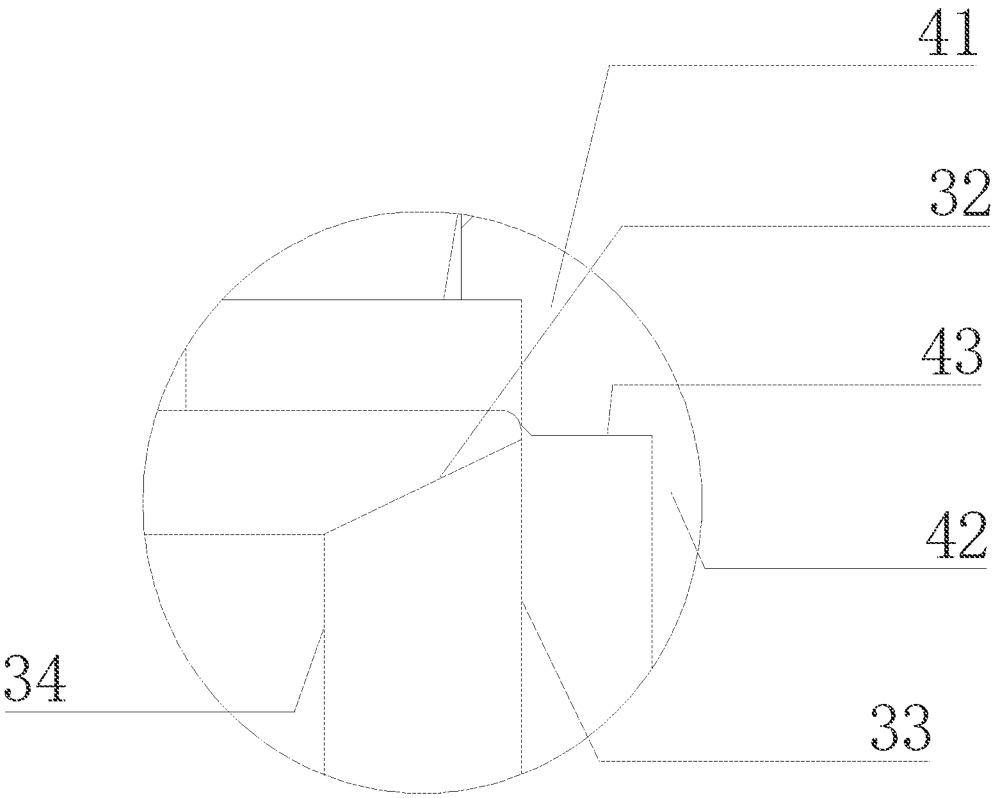
FIG. 5 illustrates an enlarged view of a selected position in FIG. 4.
Figure 6:
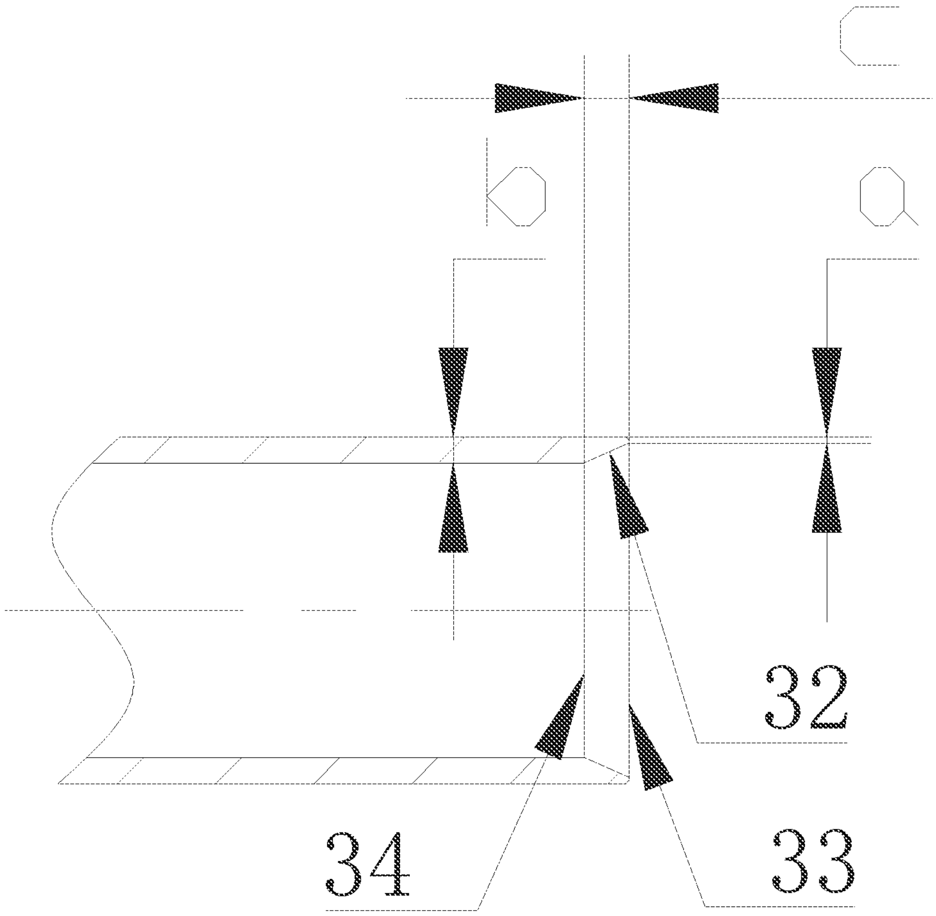
FIG. 6 illustrates a first schematic structural diagram of a first connecting pipe in a flow regulating valve.

As shown in FIG. 4 to FIG. 6, an embodiment of the present disclosure provides a flow regulating valve, including: a valve body 10, which is provided with an interface in a radial direction and is provided with a valve port 101 in an axial direction; a valve head 20, which is movably disposed in the cavity of the valve body 10, so as to open or close the valve port 101; and a first connecting pipe 31, an end of which is a mounting end, wherein the mounting end penetrates into the cavity of the valve body 10 from the interface, an inner wall surface of an opening of the mounting end is an annular flow guide surface 32, an end of the flow guide surface 32 that is located on an end surface of the mounting end is an inner end 33, an end of the flow guide surface 32 that is located in the first connecting pipe 31 is an outer end 34, and in a direction from the inner end 33 to the outer end 34, a radial size of the flow guide surface 32 gradually decreases, wherein a distance between the inner end 33 of the flow guide surface 32 and an outer wall surface of the first connecting pipe 31 is a, a distance between the outer end 34 of the flow guide surface 32 and the outer wall surface of the first connecting pipe 31 is b, a distance between the inner end 33 and the outer end 34 is c, $0.1\leq a\leq 0.5b$, and $0.5b\leq c\leq 4b$.

As shown in FIG. 4, in the present embodiment, the first connecting pipe 31 is connected to the radial interface of the valve body 10, the end of the first connecting pipe 31 entering the end of the valve body 10 that is close to the valve head 20 is the mounting end, the inner wall surface of the opening of the mounting end is the annular flow guide surface 32 of which the radial size gradually decreases in the direction from the inner end 33 to the outer end 34, and a specific shape of the flow guide surface 32 is defined by the relationship among the distances a, b and c. By using the solution, by means of the annular flow guide surface 32, which is disposed on the inner wall surface of the opening of the mounting end and of which the radial size gradually decreases in the direction from the inner end 33 to the outer end 34, the circulation resistance generated when the fluid flows through the mounting end of the first connecting pipe 31 is reduced, a circulation capability of the flow regulating valve is improved, a circulation flow is increased, and meanwhile, flanges and burrs generated during discharging can also be used. Moreover, the values of a, b and c may be adjusted according to actual use conditions of the regulating valve, so as to adaptively adjust the flow guide surface 32 to further improve the performance of the regulating valve. The distance between the inner end 33 and the outer end 34 may also be understood as an axial length of the flow guide surface 32.

Specifically, $0.25b\leq a\leq 0.4b$. In this way, the distance a between the inner end 33 and the outer wall surface of the first connecting pipe 31, and the distance b between the outer end 34 and the outer wall surface of the first connecting pipe 31 are further limited, thereby further reducing the resistance of the fluid, and improving the circulation capability of the regulating valve.

In some embodiments, $b\leq c\leq 3b$. In this way, the distance b between the outer end 34 and the outer wall surface of the first connecting pipe 31, and the distance c between the inner end 33 and the outer end 34 are further limited, thereby further reducing the resistance of the fluid, and improving the circulation capability of the regulating valve.

As shown in FIG. 6, the flow guide surface 32 may be specifically set to be a conical surface. By setting the flow guide surface 32 to be the conical surface, smooth transition of a circulation area can be realized, thereby reducing the circulation resistance generated when the fluid passes through.

In some embodiments, the flow regulating valve further includes: a guide sleeve 40, which is disposed in the cavity of the valve body 10, the valve head 20 is movably disposed in the guide sleeve 40, and the mounting end abuts against the guide sleeve 40. By the guide effect of the guide sleeve 40, it is ensured that the valve head 20 does not deviate while moving, thereby avoiding affecting the use of the regulating valve. Moreover, the mounting end abuts against the guide sleeve 40, thereby ensuring the distance between the mounting end of the first connecting pipe 31 and the valve head 20, preventing the mounting end of the first connecting pipe 31 from being too close to the valve head 20 to generate relatively large circulation resistance, and ensuring the depth of the mounting end penetrating into the valve body 10, thus improving the connection reliability.

As shown in FIG. 4, the guide sleeve 40 includes a first sleeve section 41 and a second sleeve section 42, an outer diameter of the second sleeve section 42 is less than an outer diameter of the first sleeve section 41, the second sleeve section 42 is connected with a lower end surface 43 of the first sleeve section 41, the second sleeve section 42 is close to the valve port 101 relative to the first sleeve section 41, and the mounting end abuts against the first sleeve section 41; and in the axial direction of the valve head 20, the flow guide surface 32 is located on a side of the lower end surface that faces the valve port 101. In the present embodiment, the guide sleeve 40 sequentially includes, from bottom to top, the second sleeve section 42, the lower end surface 43 and the first sleeve section 41, wherein the first sleeve section 41 abuts against the mounting end to ensure that the mounting end is not close to the valve head 20, and in the first connecting pipe 31, the flow guide surface 32 is located on the side of the lower end surface 43 that faces the valve port 101, and since the mounting end abuts against the first sleeve section 41, the specific position of the flow guide surface 32 in the valve body 10 is also determined. In the present solution, the flow guide surface 32 is disposed on the side of the lower end surface 43 that faces the valve port 101, so as to prevent a side surface of the first sleeve section 41 and the lower end surface 43 from blocking the fluid flowing through the flow guide surface 32, thereby avoiding generating resistance to the fluid, and thus ensuring the smooth flow of the fluid.

Specifically, the flow regulating valve further includes a valve needle structure 50, the valve needle structure 50 includes a screw 51, a bearing 52 and a bushing 53, the screw 51 includes a first rod section, a second rod section and a third rod section, which are sequentially connected, an outer diameter of the third rod section is greater than the outer diameter of the second rod section, the outer diameter of the second rod section is greater than an outer diameter of the first rod section, the bearing 52 is sleeved on the second rod section, the bushing 53 is sleeved on the first rod section, the bushing 53 is fixedly connected with the first rod section, two end surfaces of an inner ring of the bearing 52 respectively abut against an end surface of the third rod section and an end surface of the bushing 53, and the bearing 52 is located in the cavity of the valve head 20.

In the present embodiment, the first rod section is a mounting section of the bushing 53 and is in clearance fit, transition fit or interference fit with an inner hole of the bushing 53, one end of the bushing 53 abuts against the inner ring of the bearing 52 and may be fixed into a whole with the screw 51 via welding, the second rod section is a mounting section of the bearing 52 and is in clearance fit, transition fit or interference fit with the inner ring of the bearing 52, and the two ends of the inner ring of the bearing 52 abut against the end surface of the third rod section and the bushing 53, respectively. In this way, an axial limiting of the inner ring of the bearing 52 is achieved by the bushing 53, and deformation in the inner ring of the bearing 52 caused by an excessive stress in other limiting manners is avoided, thereby ensuring the reliability of the bearing 52, and improving the performance of the regulating valve.

In some embodiment, in the axial direction of the screw 51, the length of the second rod section is M, the length of the inner ring of the bearing 52 is N, and $N/2 \leq M < N$. The length of the second rod section is slightly less than the length of the inner ring of the bearing 52, therefore it can be ensured that the bushing 53 abuts against the bearing 52, so as to prevent the bearing 52 from moving in the axial direction.

Figure 7:
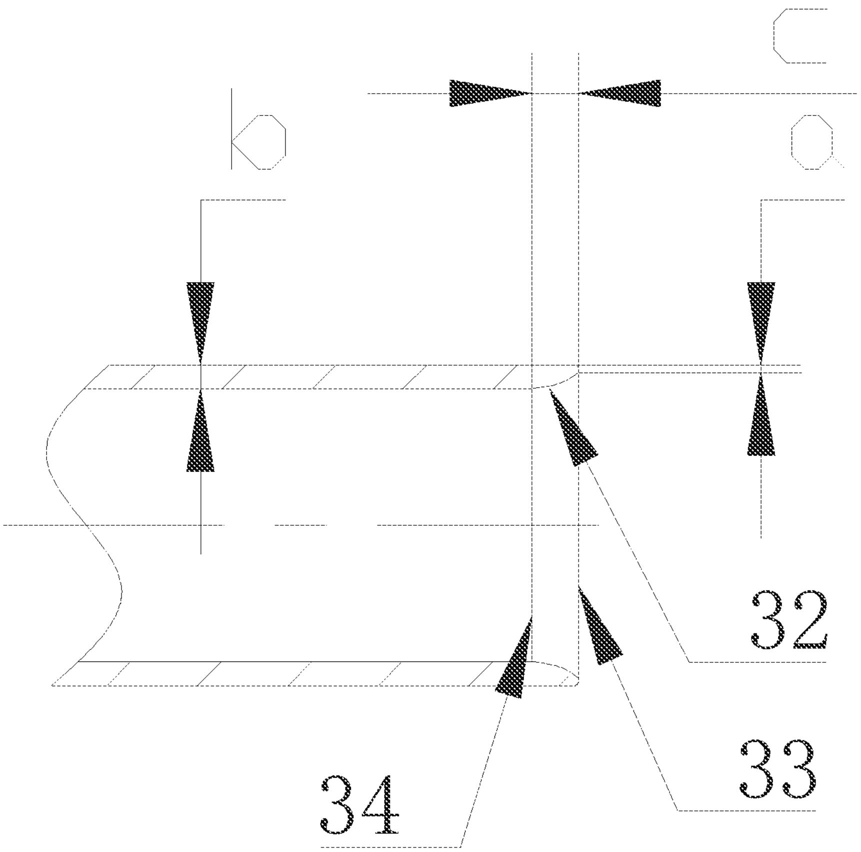
FIG. 7 illustrates a second schematic structural diagram of the first connecting pipe in the flow regulating valve.

As shown in FIG. 7, another embodiment of the present disclosure provides a flow regulating valve, and the difference lies in that the flow guide surface 32 is an arc surface. In the present embodiment, the flow guide surface 32 is set to be the arc surface, thereby reducing the circulation resistance generated when the fluid passes through, and increasing a contact area between the fluid and the mounting end of the first connecting pipe 31 when the fluid flows in.

Figure 8:
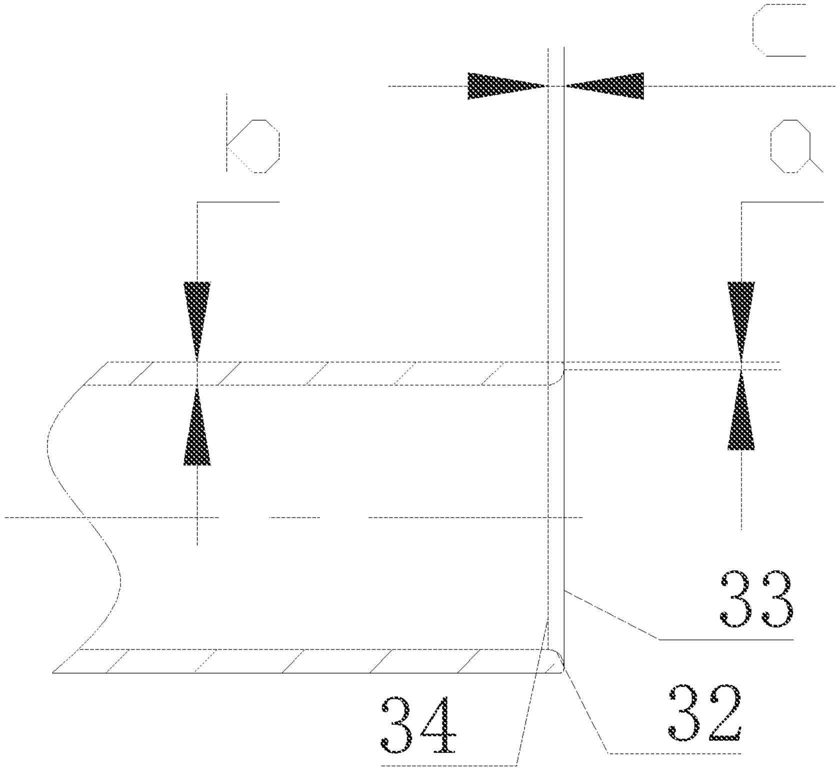
FIG. 8 illustrates a third schematic structural diagram of the first connecting pipe in the flow regulating valve.
Figure 9:
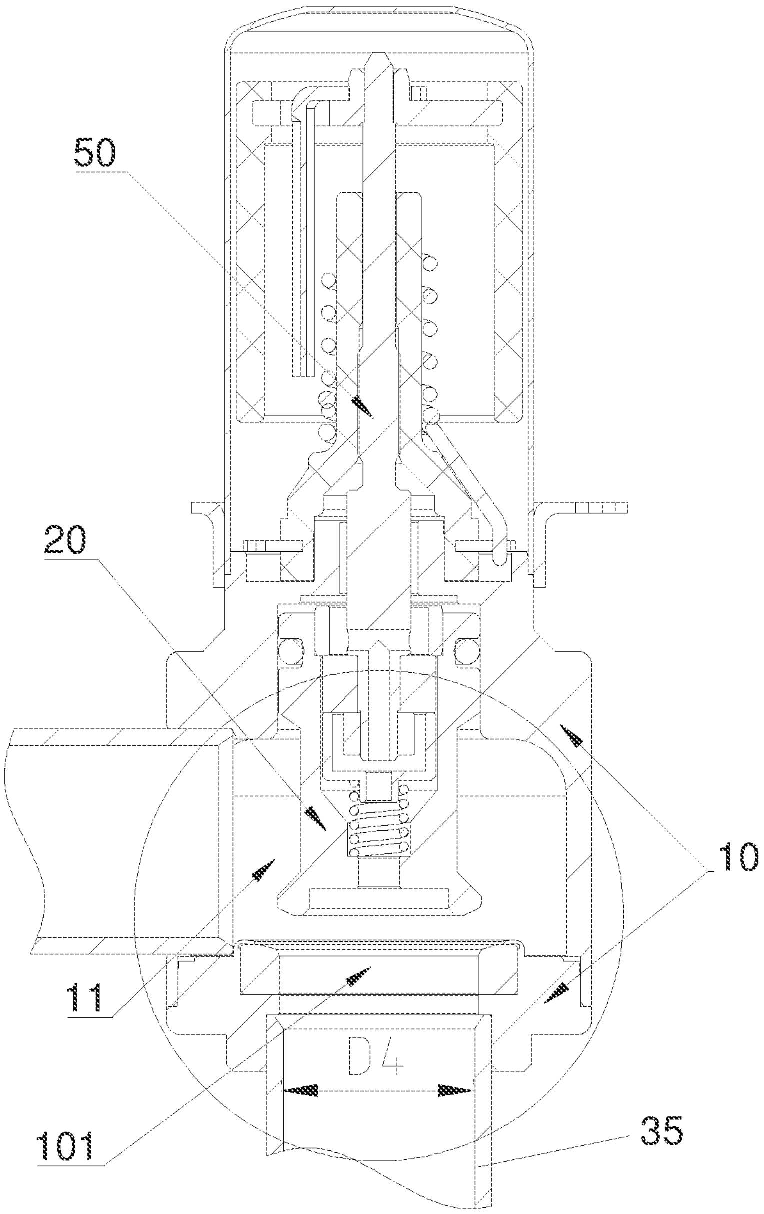
FIG. 9 illustrates a schematic structural diagram of a flow regulating valve provided in an embodiment of the present disclosure.

As shown in FIG. 8, another embodiment of the present disclosure provides a flow regulating valve, the difference lies in that: a=c=0.5b, and the flow guide surface 32 forms a fillet angle. The fillet angle belongs to a specific form of the arc surface in Embodiment 2, and may also achieve the effects of reducing the circulation resistance, increasing the contact area between the fluid and the mounting end of the first connecting pipe 31 when the fluid flows in, and increasing the circulation area of the fluid, but the difference lies in that, the design and processing of the fillet angle are simpler than those of the arc surface.

Specifically, the flow regulating valve in the above embodiments is an electronic expansion valve. By using the above embodiments, by means of the annular flow guide surface 32, which is disposed on the inner wall surface of the opening of the mounting end and of which the radial size gradually decreases in the direction from the inner end 33 to the outer end 34, the circulation resistance generated when the fluid flows through the mounting end of the first connecting pipe 31 is reduced, the circulation capability of the electronic expansion valve is improved, and the circulation flow is increased. Moreover, by adjusting the distances a, b and c, the flow guide surface 32 may be set to be an arc surface, a conical surface, or other forms. During specific design, the values of a, b and c may be adjusted according to the actual use conditions of the electronic expansion valve, so as to adaptively adjust the flow guide surface 32 to further improve the performance of the electronic expansion valve.

As shown in FIG. 9 to FIG. 15, one embodiment of the present disclosure provides a flow regulating valve, including: a valve body 10, which is provided with a valve port 101; and a valve head 20, which is movably disposed in the cavity of the valve body 10, wherein the valve head 20 includes a rod body 21 and a sealing head 22, which are connected with each other, the end of the sealing head 22 that is away from the rod body 21 is provided with a first conical surface 23, a taper angle of the first conical surface 23 is a1, $100° \leq a1 \leq 150°$, and the sealing head 22 is used for blocking the valve port 101.

In the present embodiment, by limiting the taper angle a1 of the first conical surface 23, the fluid in the cavity of the valve body 10 may be guided, compared with the sealing head 22 that is provided with no guide surface such as the conical surface in the prior art, by means of such settings, the flow resistance of the fluid in the cavity of the valve body 10 is reduced, and the performance of the flow regulating valve is improved; and moreover, by means of such settings, it is not necessary to expand the valve port 101 and the cavity of the valve body 10 to ensure the performance of the flow regulating valve, thereby reducing the volume of the flow regulating valve, and reducing the processing cost. In addition, by limiting the taper angle a1 of the first conical surface 23 within the above range, not only can an effect of reducing the resistance be achieved, but the sealing effect of the valve port 101 can also be ensured when the valve port 101 is closed.

Specifically, the radial size of the sealing head 22 is greater than the radial size of the rod body 21, and the end of the sealing head 22 that is connected with the rod body 21 is also provided with a conical surface, thereby reducing the flow resistance of the fluid in the cavity of the valve body 10, and improving the performance of the flow regulating valve.

Figure 10:
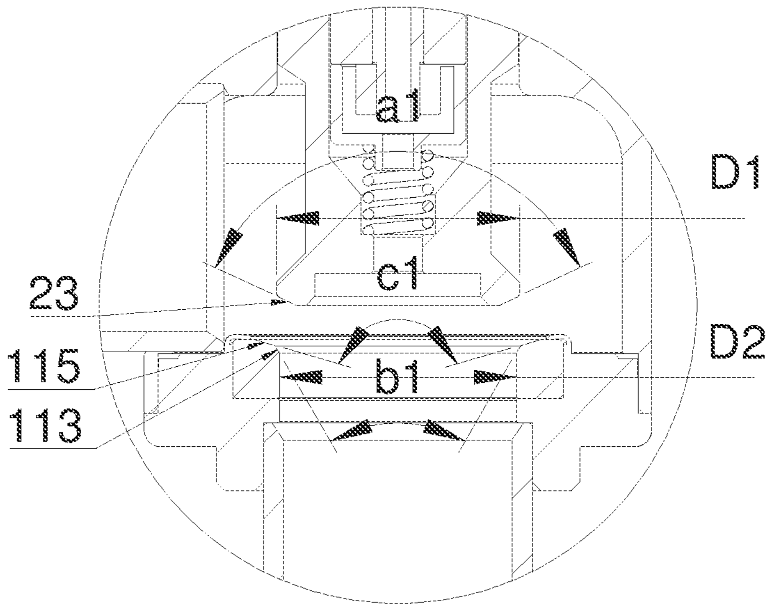
FIG. 10 illustrates an enlarged view of a selected position in the flow regulating valve of FIG. 9.
Figure 11:
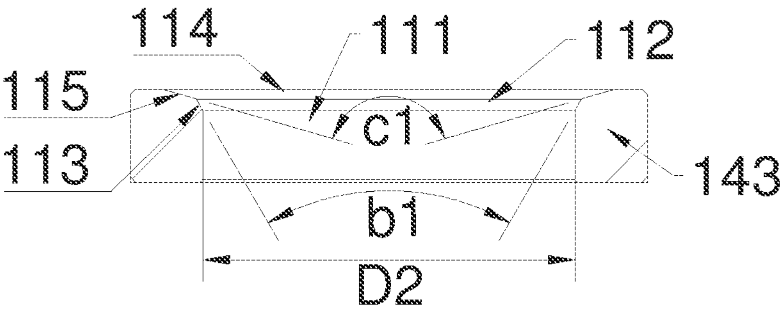
FIG. 11 illustrates a schematic structural diagram of a sealing gasket in the flow regulating valve of FIG. 9.

As shown in FIG. 10 and FIG. 11, the maximum diameter of the sealing head 22 is D1, the minimum diameter of the valve port 101 is D2, and $0.15\ \text{mm} \geq D1 - D2 \leq 1\ \text{mm}$. By means of such settings, a length of the sealing head 22 extending into the valve port 101 is ensured, and a diameter of a sealing surface formed by the valve port 101 and the sealing head 22 is also ensured to be greater than the minimum diameter D2 of the valve port, thereby improving the sealing reliability.

As shown in FIG. 11, the valve port 101 includes an overflowing hole segment 111 and a sealing hole segment 112 which are communicated with each other, a radial size of the sealing hole segment 112 gradually increases in a direction where the overflowing hole segment 111 faces the sealing hole segment 112, an inner wall of the sealing hole segment 112 forms a second conical surface 113, a taper angle of the second conical surface 113 is b1, and a1>b1. By means of such settings, it is ensured that the sealing surface of the sealing head 22 and the valve port 101 is at an attachment position of the sealing head 22 and the sealing hole segment 112, thereby ensuring the sealing reliability and preventing the leakage of the fluid.

Specifically, the minimum diameter D2 of the valve port 101 is the diameter of the overflowing hole segment 111, and the diameter D1 of the sealing head 22 is greater than the diameter D2 of the overflowing hole segment 111, thereby ensuring the sealing reliability.

In some embodiments, the valve port 101 further includes a flow guide hole segment 114, the flow guide hole segment 114 communicates with an end of the sealing hole segment 112 that is away from the overflowing hole segment 111, a radial size of the flow guide hole segment 114 gradually increases in the direction where the overflowing hole segment 111 faces the sealing hole segment 112, an inner wall of the flow guide hole segment 114 forms a third conical surface 115, a taper angle of the third conical surface 115 is c1, and c1≥b1. By means of such settings, it is ensured that the sealing head 22 does not interfere with the flow guide hole segment 114 in a moving process, thereby ensuring the sealing reliability of the sealing head 22 and the sealing hole segment 112; meanwhile, by means of such settings, the fluid flowing toward the valve port 101 may also be guided, thereby reducing the flow resistance of the fluid in the cavity of the valve body and improving the performance of the flow regulating valve.

Figure 12:
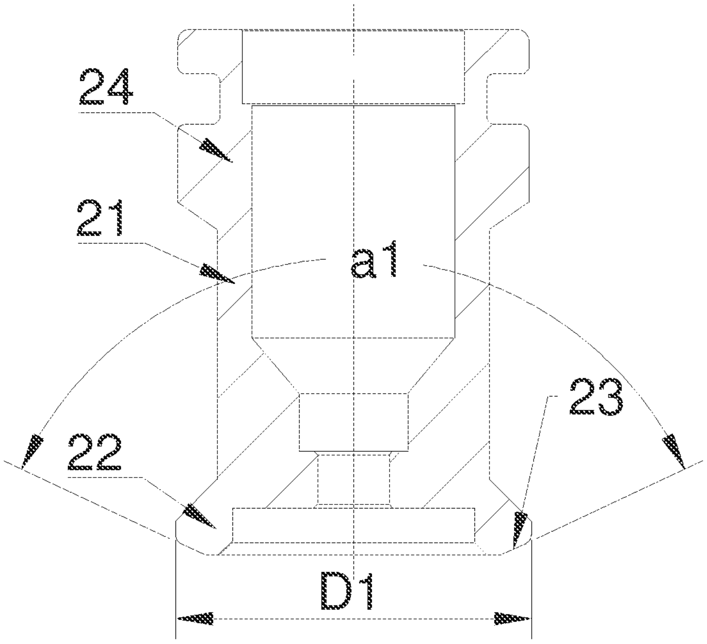
FIG. 12 illustrates a schematic structural diagram of a valve head in the flow regulating valve of FIG. 9.
Figure 13:
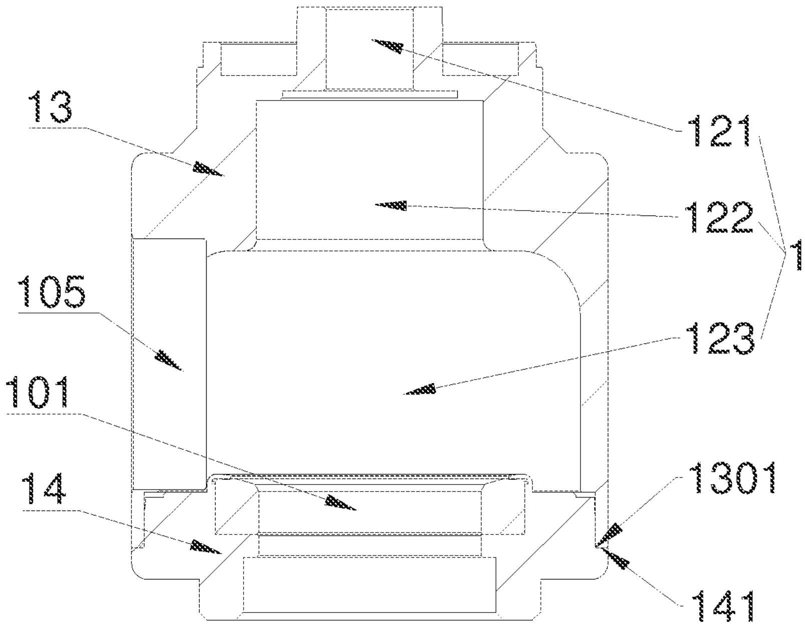
FIG. 13 illustrates a schematic structural diagram of a valve body in the flow regulating valve of FIG. 9.

As shown in FIG. 12 and FIG. 13, the valve body 10 is provided with an accommodating cavity 11, the valve head 20 further includes a guide head 24 connected with the rod body 21, a radial size of the rod body 21 is less than a radial size of the guide head 24, and an outer side wall of the guide head 24 is in limiting fit with an inner side wall of the accommodating cavity 11. By means of such settings, the movement of the valve head 20 is guided by the cooperation between the guide head 24 and the accommodating cavity 11, thereby ensuring that the valve head 20 does not deviate in the moving process, and thus ensuring the reliability of the flow regulating valve.

Further, the accommodating cavity 11 includes a limiting hole segment 121, a guide hole segment 122 and a valve cavity 123, which communicate with each other in sequence, and the guide head 24 is movably disposed in the guide hole segment 122; and the flow regulating valve further includes a valve needle structure 50, and the valve needle structure 50 is connected with the valve head 20 and is configured to pass through the limiting hole segment 121. By such settings, the movement of the valve head 20 is guided by the cooperation between the guide head 24 and the guide hole segment 122, thereby ensuring the reliability of the movement of the valve head 20; and meanwhile, the valve head 20 is connected with the valve needle structure 50, and the valve needle structure 50 is configured to pass through the limiting hole segment 121, thereby preventing the valve needle structure 50 from deviating during the process of driving the valve head 20 to move, and thus further ensuring the reliability of the movement of the valve head 20.

In some embodiments, the valve body 10 includes a main valve seat 13 and an auxiliary valve seat 14, which are connected with each other, an inner side wall of the main valve seat 13 is provided with a first step 1301, an outer side wall of the auxiliary valve seat 14 is provided with a second step 141, and the first step 1301 is in limiting fit with the second step 141.

In the present embodiment, the inner side wall of the main valve seat 13 is provided with the first step 1301, the outer side wall of the auxiliary valve seat 14 is provided with the second step 141, and the second step 141 is in limiting fit with the first step 1301. The first step 1301 includes a first step surface in the axial direction of the main valve seat 13 and a second step surface in the radial direction of the main valve seat 13, the first step surface and the second step surface form the first step 1301, the second step 141 includes a third step surface in the axial direction of the auxiliary valve seat 14 and a fourth step surface in the radial direction of the auxiliary valve seat 14, the third step surface and the fourth step surface form the second step 141, the first step surface is limiting fit with the third step surface, and the second step surface is in limiting fit with the fourth step surface. The limiting fit between the main valve seat 13 and the auxiliary valve seat 14 in the axial direction and the radial direction may be realized by the limiting fit between the two steps. Specifically, the side wall of the main valve seat is provided with a circulation hole 105 to connect an external connecting pipe, and the external connecting pipe communicates with the accommodating cavity 11.

Figure 14:
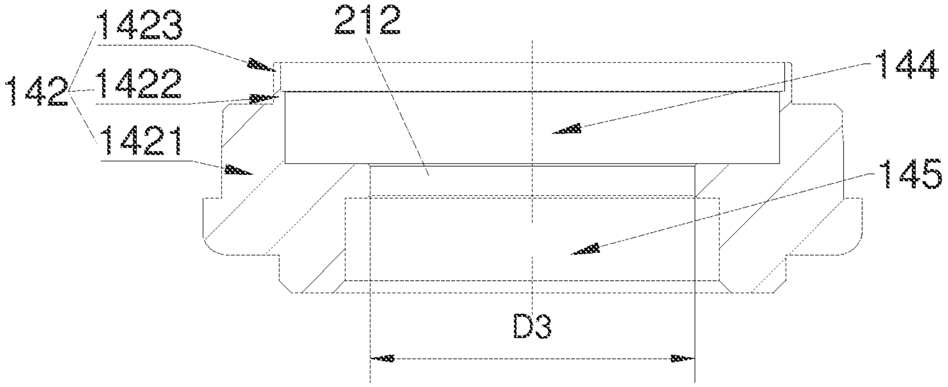
FIG. 14 illustrates a schematic structural diagram of an auxiliary valve body of the flow regulating valve of FIG. 9.

As shown in FIG. 11 and FIG. 14, the auxiliary valve seat 14 includes an auxiliary valve body 142 and a sealing gasket 143, which are connected with each other, the valve port 101 is disposed on the sealing gasket 143, a first end of the auxiliary valve body 142 is provided with a first mounting groove 144, the sealing gasket 143 is disposed in the first mounting groove 144, and the second step 141 is located on the auxiliary valve body 142. By means of such settings, there is no need to use the main valve seat 13 to limit the sealing gasket 143, so that the wall thickness of the main valve seat 13 can be relatively small, and thus the cost of the flow regulating valve is reduced.

In some embodiments, the auxiliary valve body 142 includes a main body 1421 and an annular boss 1422 disposed on the main body 1421, the auxiliary valve body 142 further includes a flanging structure 1423, the flanging structure 1423 is connected with the annular boss 1422, the flanging structure 1423 is of an annular structure, and the flanging structure 1423 is in limiting fit with the sealing gasket 143. By means of such settings, the sealing gasket 143 is installed by the flanging form of the flanging structure 1423, so that the assembly operation is simple, and the installation is reliable.

Specifically, a second end of the auxiliary valve body 142 is provided with a second mounting groove 145, so as to connect the external connecting pipe and communicate the external connecting pipe and the valve port 101.

Figure 15:
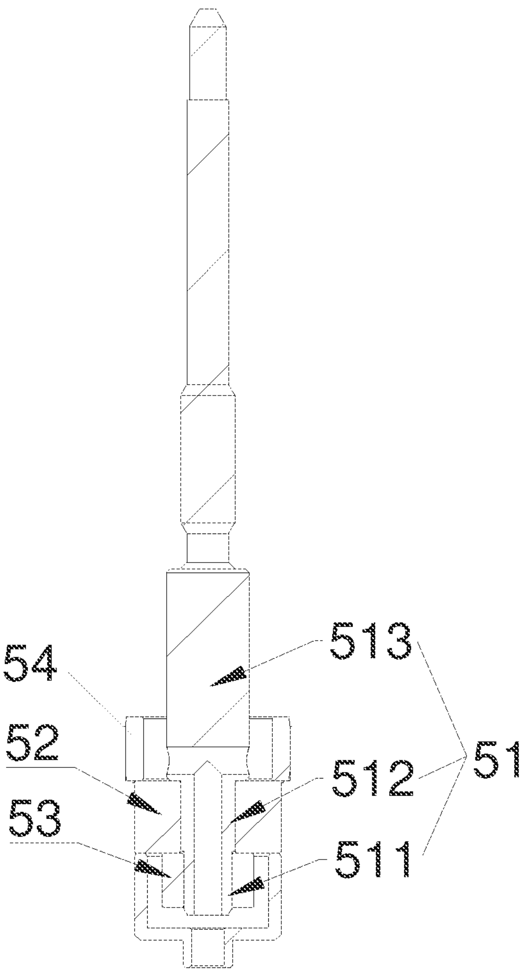
FIG. 15 illustrates a schematic structural diagram of a valve needle structure of the flow regulating valve of FIG. 9.

As shown in FIG. 15, the flow regulating valve further includes a valve needle structure 50, the valve needle structure 50 includes a screw 51, a bearing 52 and a bushing 53, the screw 51 includes a first rod section 511, a second rod section 512 and a third rod section 513, which are sequentially connected and sequentially increase in radial sizes, the bearing 52 is sleeved on the second rod section 512, the bushing 53 is sleeved on the first rod section 511 and is fixedly connected with the first rod section 511, two end surfaces of an inner ring of the bearing 52 respectively abut against an end surface of the third rod section 513 and an end surface of the bushing 53, and the bearing 52 and the bushing 53 are both located in the cavity of the valve head 20.

In the present embodiment, the first rod section 511 is a mounting section of the bushing 53 and is clearance fit, transition fit or interference fit with an inner hole of the bushing 53, one end of the bushing 53 abuts against the inner ring of the bearing 52 and may be fixed into a whole with the screw 51 via welding, the second rod section 512 is a mounting section of the bearing 52 and is in clearance fit, transition fit or interference fit with the inner ring of the bearing 52, and the two ends of the inner ring of the bearing 52 abut against the end surface of the third rod section and the bushing 53, respectively. In this way, the axial limiting of the inner ring of the bearing 52 is achieved by the bushing 53, and deformation in the inner ring of the bearing 52 caused by an excessive stress in other limiting manners is avoided, thereby ensuring the reliability of the bearing 52, and improving the performance of the regulating valve. Specifically, the third rod section 513 of the screw 51 is disposed in the limiting hole segment 121 in a penetrating manner and is in clearance fit with the limiting hole segment 121, thereby ensuring the reliability of the movement of the screw 51.

Figure 16:
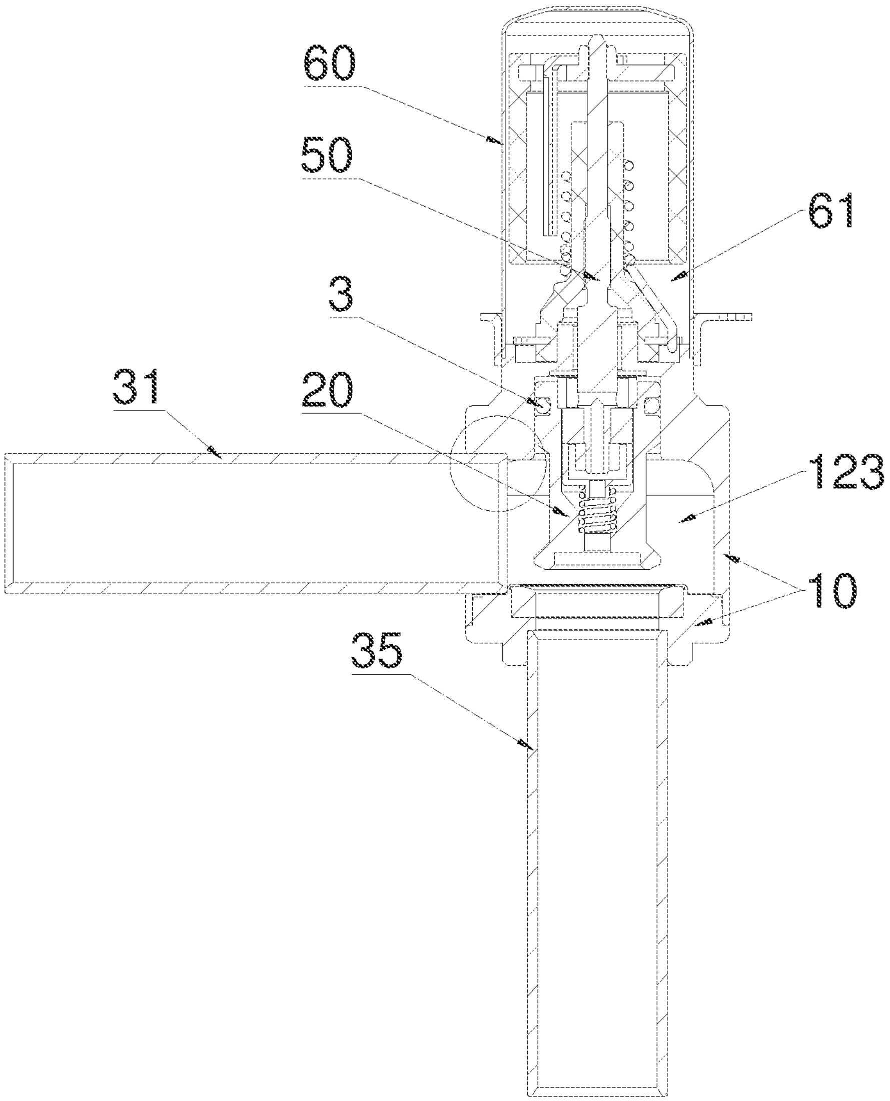
FIG. 16 illustrates a schematic structural diagram of a flow regulating valve provided in an embodiment of the present disclosure.
Figure 17:
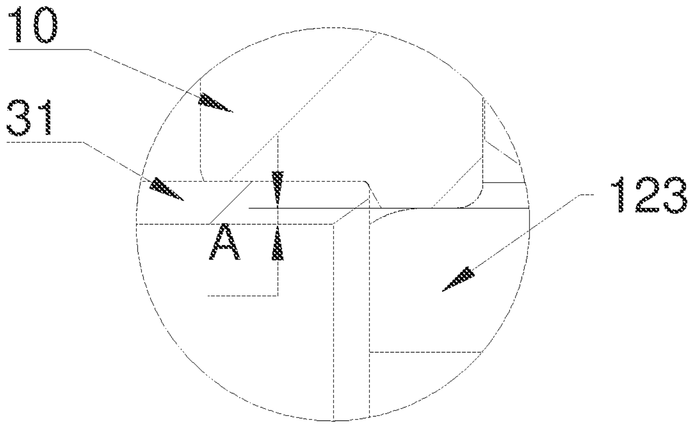
FIG. 17 illustrates an enlarged view of a selected position of the flow regulating valve of FIG. 16.
Figure 18:
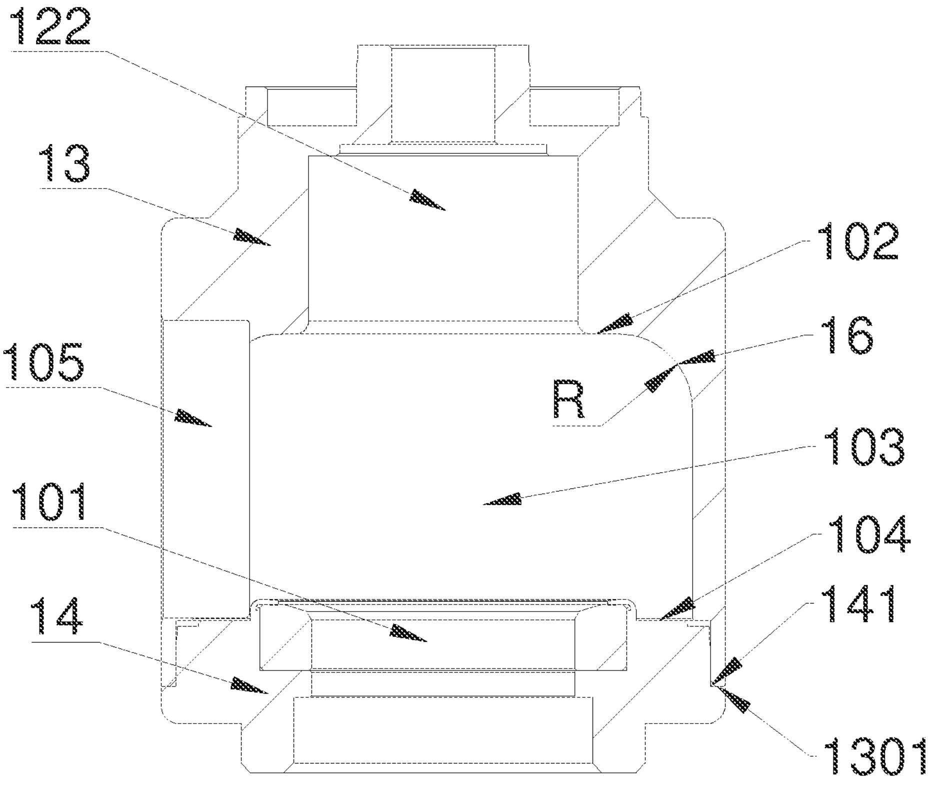
FIG. 18 illustrates a schematic structural diagram of a valve body in the flow regulating valve of FIG. 16.

As shown in FIG. 16 to FIG. 18, one embodiment of the present disclosure provides a flow regulating valve, including: a valve body 10, which is provided with a valve cavity 123, wherein two ends of the valve cavity 123 are respectively provided with a top wall 102 and a bottom wall 104, a side wall of the valve cavity 123 is provided with a circulation hole 105 that communicates with the valve cavity 123, the circulation hole 105 is located between the top wall 102 and the bottom wall 104, and the bottom wall 104 is provided with a valve port 101 that communicates with the valve cavity 123; and a valve head 20, at least part of which is movably disposed in the valve cavity 123, so as to open or close the valve port 101, wherein a joint between the top wall 102 and the side wall of the valve cavity 123 is provided with an arc surface 16, on a cross section where the axis of the valve body is located, a curvature radius of an arc of the arc surface 16 is R, and 1 mm≤R≤5 mm.

In the present embodiment, the joint between the top wall 102 and the side wall of the valve cavity 123 is set to be the arc surface 16, the fluid flowing into the valve cavity 123 is guided by the arc surface 16, thereby reducing the flow resistance of the fluid in the valve cavity 123, and improving the flow efficiency of the fluid; the curvature radius R of the arc surface 16 is limited, and when R<1 mm, the size of the arc surface 16 is too small, does not play a role in guiding the flow, and when R>5 mm, the arc surface 16 is too large to affect the volume of the valve cavity 123, so that R is limited between 1 mm and 5 mm, the fluid flowing into the valve cavity 123 is guided without affecting the overall structure of the valve body 10, thereby improving the performance of the flow regulating valve. Moreover, by means of such settings, it is not necessary to expand the valve port 101 and the valve cavity 123 to ensure the performance of the flow regulating valve, thereby reducing the volume of the flow regulating valve, and reducing the processing cost.

In some embodiments, the arc surface 16 is a part of a spherical surface. In this way, the curvature radius R is a radius of the spherical surface, which facilitates the processing of the arc surface 16.

The flow regulating valve further includes: a first connecting pipe 31, an end of the first connecting pipe 31 is disposed in the circulation hole 105, the first connecting pipe 31 communicates with the valve cavity 123, an axis of the first connecting pipe 31 is perpendicular to the axis of the valve body 10, a shortest distance between an inner wall of the first connecting pipe 31 and the top wall 102 in the axial direction of the valve body 10 is A, and A≤1 mm. In this way, by limiting the size of A, the resistance of the fluid flowing into the valve cavity 123 from the first connecting pipe 31 can be reduced, thereby increasing the flow of the fluid flowing into the valve cavity 123 from the first connecting pipe 31, and improving the performance of the flow regulating valve.

In some embodiments, the valve head 20 is provided with a guide head 24, a rod body 21 and a sealing head 22, which are connected with each other, a radial size of the rod body 21 is less than a radial size of the guide head 24 and a radial size of the sealing head 22, the valve body 10 is further provided with a guide hole segment 122 that communicates with the valve cavity 123, the guide head 24 is in limiting fit with the guide hole segment 122, the sealing head 22 is used for blocking the valve port 101, and when the valve port 101 is opened, the guide head 24 is completely located in the guide hole segment 122.

In the present embodiment, when the valve port 101 is fully opened, a part of the guide head 24 is located in the valve cavity 123, the radial size of the guide head 24 is greater than the radial size of the rod body 21, and the fluid flows into the valve cavity 123 from the first connecting pipe 31 and then makes contact with the guide head 24 and the rod body 21 respectively, so that the flow resistance of the fluid in the valve cavity 123 is increased. When the valve port 101 is fully opened, the guide head 24 is completely located in the guide hole segment 122, so that the flow resistance of the fluid in the valve cavity 123 is reduced, and the performance of the flow regulating valve is further improved.

In some embodiments, the valve port 101 includes a flow guide hole segment 114, a sealing hole segment 112 and an overflowing hole segment 111, which are sequentially connected, a radial size of the flow guide hole segment 114 gradually increases in a direction where the overflowing hole segment 111 faces the sealing hole segment 112, a radial size of the sealing hole segment 112 gradually increases in the direction where the overflowing hole segment 111 faces the sealing hole segment 112, and when the valve port 101 is closed, the sealing head 22 abuts against the sealing hole segment 112. By such settings, the fluid flows through the sealing hole segment 112 under the guidance of the flow guide hole segment 114 and finally flows into the overflowing hole segment 111, so that the flow efficiency of the fluid is improved by providing the flow guide hole segment 114; and when the valve port 101 is closed, the sealing head 22 is attached to the sealing hole segment 112 of the valve port 101 to form a sealing surface, so that the valve port 101 is closed, and the blocking reliability is ensured.

In some embodiments, an opening angle of the flow guide hole segment 114 is greater than an opening angle of the sealing hole segment 112, so that the blocking reliability and the flow efficiency of the fluid can be ensured at the same time.

An outer side wall of the guide head 24 is provided with an annular groove 241, the flow regulating valve includes an annular sealing ring 3, the annular sealing ring 3 is disposed in the annular groove 241, and an outer ring of the annular sealing ring 3 is in seal fit with an inner side wall of the guide hole segment 122.

In some embodiments, the flow regulating valve further includes a valve cylinder 60, an end of the valve cylinder 60 is connected with the end of the main valve seat 13 that is away from the auxiliary valve seat 14, a cavity of the valve cylinder 60 is a sealing cavity 61, and the sealing cavity 61 communicates with the valve cavity 123. In the present embodiment, the annular groove 241 in the outer side wall of the guide head 24 is provided with the annular sealing ring 3, so that it can be ensured that the fluid in the valve cavity 123 does not enter the sealing cavity 61 of the valve cylinder 60 via a gap between the outer side wall of the guide head 24 and the inner side wall of the flow guide hole segment 114, thereby ensuring the reliability of the flow regulating valve.

In some embodiments, the valve body 10 includes a main valve seat 13 and an auxiliary valve seat 14, which are connected with each other, the bottom wall 104 is located on the auxiliary valve seat 14, the top wall 102 is located on the main valve seat 13, an inner side wall of the main valve seat 13 is provided with a first step 1301, an outer side wall of the auxiliary valve seat 14 is provided with a second step 141, and the first step 1301 is in limiting fit with the second step 141.

In the present embodiment, the inner wall of the main valve seat 13 is provided with the first step 1301, the outer wall of the auxiliary valve seat 14 is provided with the second step 141, and the second step 141 is in limiting fit with the first step 1301. The first step 1301 includes a first step surface in the axial direction of the main valve seat 13 and a second step surface in the radial direction of the main valve seat 13, the first step surface and the second step surface form the first step 1301, the second step 141 includes a third step surface in the axial direction of the auxiliary valve seat 14 and a fourth step surface in the radial direction of the auxiliary valve seat 14, the third step surface and the fourth step surface form the second step 141, the first step surface is limiting fit with the third step surface, and the second step surface is in limiting fit with the fourth step surface. The limiting fit between the main valve seat 13 and the auxiliary valve seat 14 in the axial direction and the radial direction may be realized by the limiting fit between the two steps.

The auxiliary valve seat 14 includes an auxiliary valve body 142 and a sealing gasket 143, which are connected with each other, the valve port 101 is disposed on the sealing gasket 143, a first end of the auxiliary valve body 142 is provided with a first mounting groove, the sealing gasket 143 is disposed in the first mounting groove. By such settings, there is no need to use the main valve seat 13 to limit the sealing gasket 143, so that the wall thickness of the main valve seat 13 can be relatively small, and thus the cost of the flow regulating valve is reduced.

In some embodiments, the auxiliary valve body 142 includes a cylinder, an annular boss and a flanging structure, which are sequentially connected, the flanging structure is of an annular structure, and the flanging structure is in limiting fit with the sealing gasket 143. In this way, the sealing gasket 143 is installed via the flanging form of the flanging structure, so that the assembly operation is simple, and the installation is reliable.

Further, a second end of the auxiliary valve body 142 is provided with a second mounting groove 145, the flow regulating valve further includes a second connecting pipe 35, an end of the second connecting pipe 35 is disposed in the second mounting groove 145 in a penetrating manner, and the second connecting pipe 35 communicates with the valve port 101.

In the present embodiment, the fluid flows into the valve cavity 123 from the first connecting pipe 31, then flows into the second connecting pipe 35 via the valve port 101 that communicates with the valve cavity 123, and finally flows out from the second connecting pipe 35. Specifically, the circulation hole 105 is formed on the inner side wall of the valve cavity 123, and the axis of the first connecting pipe 31 is perpendicular to the axis of the second connecting pipe 35. By means of such settings, the flow capability of the fluid can be improved, and the performance of the flow regulating valve can be improved.

In some embodiments, the flow regulating valve further includes a valve needle structure 50, the valve needle structure 50 includes a screw 51, a bearing 52 and a bushing 53, the screw 51 includes a first rod section 511, a second rod section 512 and a third rod section 513, which are sequentially connected and sequentially increase in radial sizes, the bearing 52 is sleeved on the second rod section 512, the bushing 53 is sleeved on the first rod section 511 and is fixedly connected with the first rod section 511, two end surfaces of an inner ring of the bearing 52 respectively abut against an end surface of the third rod section 513 and an end surface of the bushing 53, and the bearing 52 and the bushing 53 are both located in the cavity of the valve head 20.

In the present embodiment, the first rod section 511 is a mounting section of the bushing 53 and is clearance fit, transition fit or interference fit with an inner hole of the bushing 53, an end of the bushing 53 abuts against the inner ring of the bearing 52 and may be fixed into a whole with the screw 51 via welding, the second rod section 512 is a mounting section of the bearing 52 and is in clearance fit, transition fit or interference fit with the inner ring of the bearing 52, and the two ends of the inner ring of the bearing 52 abut against the end surface of the third rod section 513 and the bushing 53, respectively. In this way, the axial limiting of the inner ring of the bearing 52 is achieved by the bushing 53, and deformation in the inner ring of the bearing 52 caused by an excessive stress in other limiting manners is avoided, thereby ensuring the reliability of the bearing 52, and improving the performance of the regulating valve.

In another embodiment of the present disclosure, the flow regulating valve includes: a main valve seat 13, which is provided with an accommodating cavity 11; an auxiliary valve seat 14, including an auxiliary valve body 142 and a sealing gasket 143, which are connected with each other, wherein the auxiliary valve body 142 is connected with the main valve seat 13, the sealing gasket 143 is provided with a valve port 101, the valve port 101 communicates with the accommodating cavity 11, and the end of the auxiliary valve body 142 that is away from the valve port 101 is provided with a second mounting groove 145; a valve head 20, which is movably disposed in the accommodating cavity 11, so as to block or open the valve port 101; and a second connecting pipe 35, wherein an end of the second connecting pipe 35 is disposed in the second mounting groove 145, and the second connecting pipe 35 communicates with the valve port 101; and a circulation area of the valve port 101 is S1, and a circulation area of the second connecting pipe 35 is S2, and $|S1-S2| \leq 0.15S1$.

In the present embodiment, by limiting the relationship between the circulation area S1 of the valve port 101 and the circulation area S2 of the second connecting pipe 35, the flow resistance of the fluid in the accommodating cavity 11 when entering the second connecting pipe 35 via the valve port 101 can be reduced, so that the fluidity of the fluid is improved, and the flow of the fluid is increased, therefore the performance of the flow regulating valve is improved. Moreover, by means of such settings, it is not necessary to expand the valve port 101 and the accommodating cavity 11 to ensure the performance of the flow regulating valve, thereby reducing the volume of the flow regulating valve, and reducing the processing cost.

The auxiliary valve body 142 is further provided with a connecting hole 212 and a first mounting groove 144, the sealing gasket 143 is disposed in the first mounting groove 144, the valve port 101, the connecting hole 212 and the second connecting pipe 35 communicate with each other in sequence, a circulation area of the connecting hole 212 is S3, and $|S1-S3| \leq 0.15S1$.

In the present embodiment, the connecting hole 212 is located between the valve port 101 and the second connecting pipe 35, by limiting the relationship between the circulation area S3 of the connecting hole 212 and the circulation area S1 of the valve port 101, the resistance of the fluid flowing into the connecting hole 212 via the valve port 101 is reduced, and it is ensured that the connecting hole 212 does not affect the fluid passing through the valve port 101, thereby improving the fluidity of the fluid in the flow regulating valve, and improving the performance of the flow regulating valve.

The minimum diameter of the valve port 101 is D2, an inner diameter of the second connecting pipe 35 is D4, an inner diameter of the connecting hole 212 is D3, $D3 \geq D2$, and $D3 \geq D4$. By such settings, it is ensured that a first step surface formed by the second mounting groove 145 and the connecting hole 212 can limit an insertion depth of the second connecting pipe 35, it is ensured that a second step surface formed by the first mounting groove 144 and the connecting hole 212 can limit an insertion depth of the sealing gasket 143, and meanwhile the sealing gasket 143 is presented from interfering with the second connecting pipe 35 in a mounting process, thereby ensuring the stability and reliability of the flow regulating valve. Moreover, the connecting hole 212 does not hinder the flow of the fluid.

In some embodiments, the circulation area S1 is the area of a position where D2 is located, the circulation area S2 is the area of a position where D4 is located, and the circulation area S3 is the area of a position where D3 is located.

Further, the auxiliary valve body 142 includes a main body 1421 and an annular boss 1422 disposed on the main body 1421, the auxiliary valve body 142 further includes a flanging structure 1423, the flanging structure 1423 is connected with the annular boss 1422, a part of the main body 1421 and the annular boss 1422 are enclosed to form the first mounting groove 144, the wall thickness of the flanging structure 1423 is less than the wall thickness of the annular boss 1422, and the flanging structure 1423 is in limiting fit with the sealing gasket 143.

In the present embodiment, the sealing gasket 143 is fixed in the main body 1421 and the annular boss 1422 by the flanging structure 1423, so as to prevent the sealing gasket 143 from shaking and rotating in the auxiliary valve body 142, and to avoid the deformation of the sealing gasket 143 due to a relatively large radial force; and moreover, by means of such settings, there is no need to use the main valve seat 13 to limit the sealing gasket 143, so that the wall thickness of the main valve seat 13 can be relatively small, and the assembly operation is facilitated by using the flanging form, thereby reducing the cost of the flow regulating valve.

Specifically, the wall thickness of the annular boss 1422 is less than the wall thickness of the main body 1421, so that the wall thickness of the annular boss 1422 is greater than the wall thickness of the flanging structure 1423 and less than the wall thickness of the main body 1421, thereby ensuring the smooth flanging of the flanging structure 1423, avoiding affecting the sealing gasket 143 during flanging, and being unlikely to result in deformation of the sealing gasket 143 due to a stress.

In some embodiments, the flanging structure 1423 is of an annular structure, the flanging structure 1423 is attached to the sealing gasket 143, a distance between an inner circumferential surface of the flanging structure 1423 and the valve port 101 is a2, and 0.2 mm≤a2≤2 mm.

In the present embodiment, by means of limiting the a2, the reliability of the flanging structure 1423 is ensured. If a2<0.2 mm, the flanging structure 1423 is too long, such that the flanging structure 1423 is prone to a damage at the flanging and bending position; and if a2>2 mm, the flanging structure 1423 is too short, resulting in an excessively small attachment area between the flanging structure 1423 and the sealing gasket 143 after flanging, such that the pressing of the sealing gasket 143 cannot be ensured, thus reducing the reliability of the auxiliary valve seat.

Specifically, the inner circumferential surface of the flanging structure 1423 is an annular surface of the flanging structure 1423 that faces the axis of the valve port 101 after the flanging structure 1423 is attached to the sealing gasket 143.

The valve head 20 is provided with an accommodating hole, and the valve needle structure 50 includes: a screw 51, including a first rod section 511, a second rod section 512 and a third rod section 513, which are sequentially connected and sequentially increase in radial sizes; a bushing 53, which is sleeved on the first rod section 511, is fixedly connected with the first rod section 511, and is located in the accommodating hole; a bearing 52, which is sleeved on the second rod section 512, wherein two ends of an inner ring of the bearing 52 respectively abut against an end surface of the third rod section 513 and an end surface of the bushing 53, and a side wall of the bearing 52 is in limiting fit with a side wall of the accommodating hole; and a pressing sleeve 54, which is fixedly connected with the accommodating hole, wherein an end of the pressing sleeve 54 abuts against an end surface of the outer ring of the bearing 52 that faces the third rod section 513.

In the present embodiment, the first rod section 511 is a mounting section of the bushing 53 and is in clearance fit, transition fit or interference fit with an inner hole of the bushing 53, an end of the bushing 53 abuts against the inner ring of the bearing 52 and may be fixed into a whole with the screw 51 via welding, the second rod section 512 is a mounting section of the bearing 52 and is in clearance fit, transition fit or interference fit with the inner ring of the bearing 52, and the two ends of the inner ring of the bearing 52 abut against the end surface of the third rod section 513 and the bushing 53, respectively. In this way, the axial limiting of the inner ring of the bearing 52 is achieved by the bushing 53, and deformation in the inner ring of the bearing 52 caused by an excessive stress in other limiting manners is avoided, thereby ensuring the reliability of the bearing 52, and improving the performance of the regulating valve.

The above descriptions are only some embodiments of the present disclosure, and are not intended to limit the present disclosure. For those skilled in the art, the present disclosure may have various modifications and changes. Any modifications, equivalent replacements, improvements and the like, made within the spirit and principles of the present disclosure, shall all be included in the scope of the claims of the present disclosure.

What is claimed is:

1. A flow regulating valve, comprising a valve head structure, wherein the flow regulating valve further comprises:

a valve body, which is provided with an interface in a radial direction and is provided with a valve port in an axial direction, wherein the valve head is movably disposed in the cavity of the valve body, so as to open or close the valve port; and a first connecting pipe, an end of which is a mounting end, wherein the mounting end penetrates into the cavity of the valve body from the interface, an inner wall surface of an opening of the mounting end is an annular flow guide surface, a first end of the flow guide surface that is located on an end surface of the mounting end is an inner end, a second end of the flow guide surface that is located in the first connecting pipe is an outer end, and in a direction from the inner end to the outer end, a radial size of the flow guide surface gradually decreases, wherein a distance between the inner end of the flow guide surface and an outer wall surface of the first connecting pipe is a, a distance between the outer end (34) of the flow guide surface and the outer wall surface of the first connecting pipe is b, a distance between the inner end and the outer end is c, $0.1b \leq a \leq 0.5b$, and $0.5b \leq c \leq 4b$;

wherein the valve head structure is disposed in the valve body for closing or avoiding a valve port of the valve body, wherein the valve head structure comprises:

a valve head, which is movably disposed in the valve body; and an accommodating groove, which is formed in the valve head and is used for accommodating fluid in the valve body, wherein a distance between the valve head and the valve port is adjustable, and when the valve head moves to a position where with the valve port is the maximum, at least part of the accommodating groove is located in an accommodating cavity of the valve body.

2. The flow regulating valve according to claim 1, wherein the accommodating groove is disposed around the valve head; and/or, the accommodating groove is of an annular structure.

3. The flow regulating valve according to claim 1, wherein the accommodating groove is provided with a first transition section, and the first transition section is located at a first end of the accommodating groove that is away from the valve port; and a cross-sectional area of the first transition section gradually decreases in a direction where the valve head is close to the valve port.

4. The flow regulating valve according to claim 1, wherein the valve head comprises a sealing head for blocking the valve port, and the sealing head is disposed at a second end of the accommodating groove that is close to the valve port; the accommodating groove is provided with a second transition section, and the second transition section is located at an end of the accommodating groove that is close to the sealing head; and a cross-sectional area of the second transition section gradually increases in a direction where the accommodating groove is close to the sealing head.

5. The flow regulating valve according to claim 1, wherein the valve head comprises an accommodating cavity body, the accommodating cavity body is used for accommodating a fluid in the accommodating cavity, the valve head comprises a circulation channel, a first end of the circulation channel communicates with the accommodating cavity body, and a second end of the circulation channel communicates with the accommodating cavity.

6. The flow regulating valve according to claim 5, wherein the circulation channel comprises a first circulation channel and a second circulation channel, the first circulation channel communicates with the accommodating cavity body, and the second circulation channel is used for communicating with the accommodating cavity; and in an extension direction of the valve head, the cross-sectional area of the second circulation channel is greater than a cross-sectional area of the first circulation channel.

7. The flow regulating valve according to claim 1, wherein a first end of the valve head that is close to the valve port is provided with a sealing head for blocking the valve port, a second end of the valve head that is away from the valve port is provided with a guide head for contacting with the valve body, the sealing head and the guide head are both of cylindrical structures, and a diameter of a sealing line formed by the sealing head and the valve port is equal to an outer diameter of the guide head.

8. The flow regulating valve according to claim 1, wherein $0.25b \leq a \leq 0.4b$, and $b \leq c \leq 3b$; or, the flow guide surface is a conical surface or an arc surface; or, $a=c=0.5b$, and the flow guide surface forms a fillet angle.

9. The flow regulating valve according to claim 1, wherein the flow regulating valve further comprises:

a guide sleeve (40), which is disposed in the cavity of the valve body, wherein the valve head is movably disposed in the guide sleeve, and the mounting end is abutted against the guide sleeve;

wherein the guide sleeve comprises a first sleeve section and a second sleeve section, an outer diameter of the second sleeve section is less than an outer diameter of the first sleeve section, the second sleeve section is connected with a lower end surface of the first sleeve section, the second sleeve section is close to the valve port relative to the first sleeve section, and the mounting end abuts against the first sleeve section; and in an axial direction of the valve head, the flow guide surface is located on a side of the lower end surface that faces the valve port.

10. The flow regulating valve according to claim 1, wherein the flow regulating valve further comprises:

a valve needle structure, the valve needle structure comprises a screw, a bearing and a bushing, the screw comprises a first rod section, a second rod section and a third rod section, which are sequentially connected, an outer diameter of the third rod section is greater than an outer diameter of the second rod section, the outer diameter of the second rod section is greater than an outer diameter of the first rod section, the bearing is sleeved on the second rod section, the bushing is sleeved on the first rod section, the bushing is fixedly connected with the first rod section, two end surfaces of an inner ring of the bearing respectively abut against an end surface of the third rod section and an end surface of the bushing, and the bearing is located in a cavity of the valve head.

11. A flow regulating valve, comprising a valve head structure, wherein the flow regulating valve further comprises:

a valve body, the valve body is provided with a valve port, the valve head structure is disposed in the valve body for closing or avoiding the valve port, wherein the valve head structure comprises:

a valve head, which is movably disposed in the valve body; and an accommodating groove, which is formed in the valve head and is used for accommodating fluid in the valve body, wherein a distance between the valve head and the valve port is adjustable, and when the valve head moves to a position where with the valve port is the maximum, at least part of the accommodating groove is located in an accommodating cavity of the valve body; the valve head comprises a rod body and a sealing head, which are connected with each other, an end of the sealing head that is away from the rod body is provided with a first conical surface, a taper angle of the first conical surface is a1, 100%≤a1≤150°, and the sealing head is used for blocking the valve port;

wherein the valve port comprises an overflowing hole segment and a sealing hole segment, which communicate with each other, a radial size of the sealing hole segment gradually increases in a direction where the overflowing hole segment faces the sealing hole segment, an inner wall of the sealing hole segment forms a second conical surface, a taper angle of the second conical surface is b1, and a1>b1.

12. The flow regulating valve according to claim 11, wherein a radial size of the sealing head is greater than a radial size of the rod body, a maximum diameter of the sealing head is D1, a minimum diameter of the valve port is D2, and 0.15 mm≤D1-D2≤1 mm.

13. The flow regulating valve according to claim 11, wherein the valve port further comprises a flow guide hole segment, the flow guide hole segment communicates with an end of the sealing hole segment that is away from the overflowing hole segment, a radial size of the flow guide hole segment gradually increases in the direction where the overflowing hole segment faces the sealing hole segment, an inner wall of the flow guide hole segment forms a third conical surface, a taper angle of the third conical surface is c1, and c1≥b1.

14. The flow regulating valve according to claim 11, wherein the valve body is provided with the accommodating cavity, the valve head further comprises a guide head connected with the rod body, a radial size of the rod body is less than a radial size of the guide head, and an outer side wall of the guide head is in limiting fit with an inner side wall of the accommodating cavity.

15. The flow regulating valve according to claim 14, wherein the accommodating cavity comprises a limiting hole segment, a guide hole segment and a valve cavity, which communicate with each other in sequence, and the guide head is movably disposed in the guide hole segment; and the flow regulating valve further comprises a valve needle structure, and the valve needle structure is connected with the valve head and is configured to pass through the limiting hole segment.

16. The flow regulating valve according to claim 11, wherein the valve body comprises a main valve seat and an auxiliary valve seat, which are connected with each other, an inner side wall of the main valve seat is provided with a first step, an outer side wall of the auxiliary valve seat is provided with a second step, and the first step is in limiting fit with the second step.

17. The flow regulating valve according to claim 16, wherein the auxiliary valve seat comprises an auxiliary valve body and a sealing gasket, which are connected with each other, the valve port is disposed on the sealing gasket, an end of the auxiliary valve body is provided with a first mounting groove, the sealing gasket is disposed in the first mounting groove, and the second step is located on the auxiliary valve body.

18. The flow regulating valve according to claim 17, wherein the auxiliary valve body comprises a main body and an annular boss disposed on the main body, the auxiliary valve body further comprises a flanging structure, the flanging structure is connected with the annular boss, the flanging structure is of an annular structure, and the flanging structure is in limiting fit with the sealing gasket.

19. A flow regulating valve, comprising a valve head structure, wherein the flow regulating valve further comprises:

a valve body, the valve body is provided with a valve cavity, the valve head structure is disposed in the valve body for closing or avoiding a valve port of the valve body, wherein the valve head structure comprises:

a valve head, which is movably disposed in the valve body; and an accommodating groove, which is formed in the valve head and is used for accommodating fluid in the valve body, wherein a distance between the valve head and the valve port is adjustable, and when the valve head moves to a position where with the valve port is the maximum, at least part of the accommodating groove is located in an accommodating cavity of the valve body;

two ends of the valve cavity are respectively provided with a top wall and a bottom wall, a side wall of the valve cavity is provided with a circulation hole that communicates with the valve cavity, the circulation hole is located between the top wall and the bottom wall, and the bottom wall is provided with the valve port that communicates with the valve cavity, and at least part of the valve head is movably disposed in the valve cavity, so as to open or close the valve port; and a joint between the top wall and the side wall of the valve cavity is provided with an arc surface, on a cross section where an axis of the valve body is located, a curvature radius of an arc of the arc surface is R, and 1 mm≤R≤5 mm.

20. The flow regulating valve according to claim 19, wherein the flow regulating valve further comprises:

a first connecting pipe, an end of the first connecting pipe is disposed in the circulation hole, the first connecting pipe communicates with the valve cavity, an axis of the first connecting pipe is perpendicular to the axis of the valve body, a shortest distance between an inner wall of the first connecting pipe and the top wall in an axial direction of the valve body is A, and A≤1 mm.

21. The flow regulating valve according to claim 19, wherein the valve head is provided with a guide head, a rod body and a sealing head, which are connected with each other, a radial size of the rod body is less than a radial size of the guide head and a radial size of the sealing head, the valve body is further provided with a guide hole segment that communicates with the valve cavity), the guide head is in limiting fit with the guide hole segment, the sealing head is used for blocking the valve port, and when the valve port is opened, the guide head is completely located in the guide hole segment.

22. A flow regulating valve, comprising a valve head structure, the valve head structure is disposed in the valve body for closing or avoiding a valve port of the valve body, wherein the valve head structure comprises:

a valve head, which is movably disposed in the valve body; and an accommodating groove, which is formed in the valve head and is used for accommodating fluid in the valve body, wherein a distance between the valve head and the valve port is adjustable, and when the valve head moves to a position where with the valve port is the maximum, at least part of the accommodating groove is located in an accommodating cavity of the valve body;

wherein the flow regulating valve further comprises:

a main valve seat, which is provided with the accommodating cavity;

an auxiliary valve seat, comprising an auxiliary valve body and a sealing gasket connected with the auxiliary valve body, wherein the auxiliary valve body is connected with the main valve seat, the sealing gasket is provided with the valve port, the valve port communicates with the accommodating cavity, an end of the auxiliary valve body that is away from the valve port is provided with a second mounting groove, the valve head is movably disposed in the accommodating cavity, so as to block or open the valve port; and a second connecting pipe, wherein an end of the second connecting pipe is disposed in the second mounting groove, and the second connecting pipe communicates with the valve port, wherein a circulation area of the valve port is S1, and a circulation area of the second connecting pipe is S2, and |S1-S2|≤0.15S1.

23. The flow regulating valve according to claim 22, wherein the auxiliary valve body is further provided with a connecting hole and a first mounting groove, the sealing gasket is disposed in the first mounting groove, the valve port, the connecting hole and the second connecting pipe communicate with each other in sequence, a circulation area of the connecting hole is S3, and |S1-S3|≤0.15S1.

24. The flow regulating valve according to claim 23, wherein a minimum diameter of the valve port is D2, an inner diameter of the second connecting pipe is D4, an inner diameter of the connecting hole is D3, D3≥D2, and D3≥D4.

25. The flow regulating valve according to claim 18, wherein the flanging structure is of an annular structure, the flanging structure is attached to the sealing gasket, a distance between an inner circumferential surface of the flanging structure and the valve port is a2, and 0.2 mm≤a2≤2 mm.

26. A flow regulating valve, comprising a valve head structure, the valve head structure is disposed in the valve body for closing or avoiding a valve port of the valve body, wherein the valve head structure comprises:

a valve head, which is movably disposed in the valve body; and an accommodating groove, which is formed in the valve head and is used for accommodating fluid in the valve body, wherein a distance between the valve head and the valve port is adjustable, and when the valve head moves to a position where with the valve port is the maximum, at least part of the accommodating groove is located in an accommodating cavity of the valve body;

the flow regulating valve further comprises:

a valve needle structure, the valve needle structure comprises a screw, a bearing and a bushing, the screw comprises a first rod section, a second rod section and a third rod section, which are sequentially connected, an outer diameter of the third rod section is greater than an outer diameter of the second rod section, the outer diameter of the second rod section is greater than an outer diameter of the first rod section, the bearing is sleeved on the second rod section, the bushing is sleeved on the first rod section, the bushing is fixedly connected with the first rod section, two end surfaces of an inner ring of the bearing respectively abut against an end surface of the third rod section and an end surface of the bushing, and the bearing is located in a cavity of the valve head.

* * * * *